US012425095B2

United States Patent
Farmahini Farahani et al.

(10) Patent No.: US 12,425,095 B2
(45) Date of Patent: Sep. 23, 2025

(54) PASSIVE MIMO DEVICE

(71) Applicant: QUALCOMM Incorporated, San Diego, CA (US)

(72) Inventors: Mohsen Farmahini Farahani, Encinitas, CA (US); Lida Akhoondzadehasl, Sunnyvale, CA (US); Allen Minh-Triet Tran, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 469 days.

(21) Appl. No.: 17/934,886

(22) Filed: Sep. 23, 2022

(65) Prior Publication Data
US 2024/0106520 A1 Mar. 28, 2024

(51) Int. Cl.
H04B 7/145 (2006.01)
H01Q 1/50 (2006.01)
(Continued)

(52) U.S. Cl.
CPC ............. H04B 7/145 (2013.01); H01Q 1/50 (2013.01); H01Q 3/40 (2013.01); H01Q 19/06 (2013.01); H01Q 21/061 (2013.01)

(58) Field of Classification Search
CPC ............. H04B 7/145; H04B 7/04013; H04B 7/15528; H04B 7/0874; H04B 7/0691;
(Continued)

(56) References Cited

U.S. PATENT DOCUMENTS 5,289,142 A * 2/1994 Upton ...................... H04B 1/48
8,558,633 B2 * 10/2013 McKinzie ................ H04B 1/44
(Continued)

FOREIGN PATENT DOCUMENTS

EP        2608317 A1    6/2013
WO     2020253555 A1   12/2020

OTHER PUBLICATIONS

International Search Report and Written Opinion—PCT/US2023/074114—ISA/EPO—Jan. 15, 2024.
(Continued)

Primary Examiner — Lana N Le
(74) Attorney, Agent, or Firm — Polsinelli/Qualcomm Incorporated

(57) ABSTRACT

Aspects of the disclosure related to devices, wireless communication apparatuses, methods, and other aspects of passive multiple input multiple output. In some aspects, an apparatus is provided that includes a first radio frequency (RF) transmission line having a first terminated with a quarter wavelength grounded transmission line, and a first array of antennas including a plurality of antenna elements. The apparatus also includes a switch array including a corresponding switch for each antenna element of the plurality of antenna elements of the first array of antennas, to selectively connect each antenna element to the first RF transmission line, and path lengths selectable by the switches at half wavelength distances for passive transmission. The apparatus also includes or more lens elements configured to modify wireless inputs signals to the first array of antennas and to modify wireless output signals from the first array of antennas.

20 Claims, 15 Drawing Sheets

(51) Int. Cl.
*H01Q 3/40* (2006.01)
*H01Q 19/06* (2006.01)
*H01Q 21/06* (2006.01)

(58) Field of Classification Search
CPC ... H04B 1/48; H04B 1/44; H04B 1/04; H04B 1/006; H04B 3/00; H04B 10/506; H04B 1/18; H04B 7/088; H01Q 1/50; H01Q 3/40; H01Q 19/06; H01Q 21/061; H01Q 25/008; H01Q 1/246; H01Q 21/00; H01Q 21/29; H01Q 1/2291; H01Q 3/26; H01Q 23/00; H01Q 1/22; H01Q 1/52; H04Q 2011/0052; H04Q 2011/0058; H04Q 2011/0011; H04Q 2011/0009; H04W 88/02
See application file for complete search history.

(56) References Cited

U.S. PATENT DOCUMENTS

| | | | | |
|---|---|---|---|---|
| 11,329,697 | B2* | 5/2022 | Frank | H04B 5/72 |
| 11,374,318 | B2* | 6/2022 | Morita | H01Q 21/065 |
| 2002/0177417 | A1* | 11/2002 | Visser | H04B 1/48 |
| 2004/0027305 | A1 | 2/2004 | Pleva et al. | |
| 2013/0072125 | A1* | 3/2013 | Yoon | H04B 1/40 455/67.11 |
| 2020/0243981 | A1 | 7/2020 | Karabacak et al. | |
| 2020/0382208 | A1 | 12/2020 | Hormis et al. | |
| 2024/0372237 | A1* | 11/2024 | Liang | H01Q 13/025 |

OTHER PUBLICATIONS

Li Q., et al., "Reconfigurable Intelligent Surfaces Relying on Non-Diagonal Phase Shift Matrices", Arxiv.Org, Cornell University Library, 201 Olin Library Cornell University Ithaca, NY 14853, Mar. 15, 2022, XP091191309, pp. 1-16, Section II.A, Section II.B, Equation 14 figure 3.

Wang Y., et al., "Intelligent Reflecting Surface-Assisted mmWave Communication with Lens Antenna Array", IEEE Transactions on Cognitive Communications and Networking, USA, vol. 8, No. 1, Sep. 21, 2021, pp. 202-215, XP011902299, DOI: 10.1109/TCCN. 2021.3114184 [retrieved on Mar. 7, 2022] figure 1.

* cited by examiner

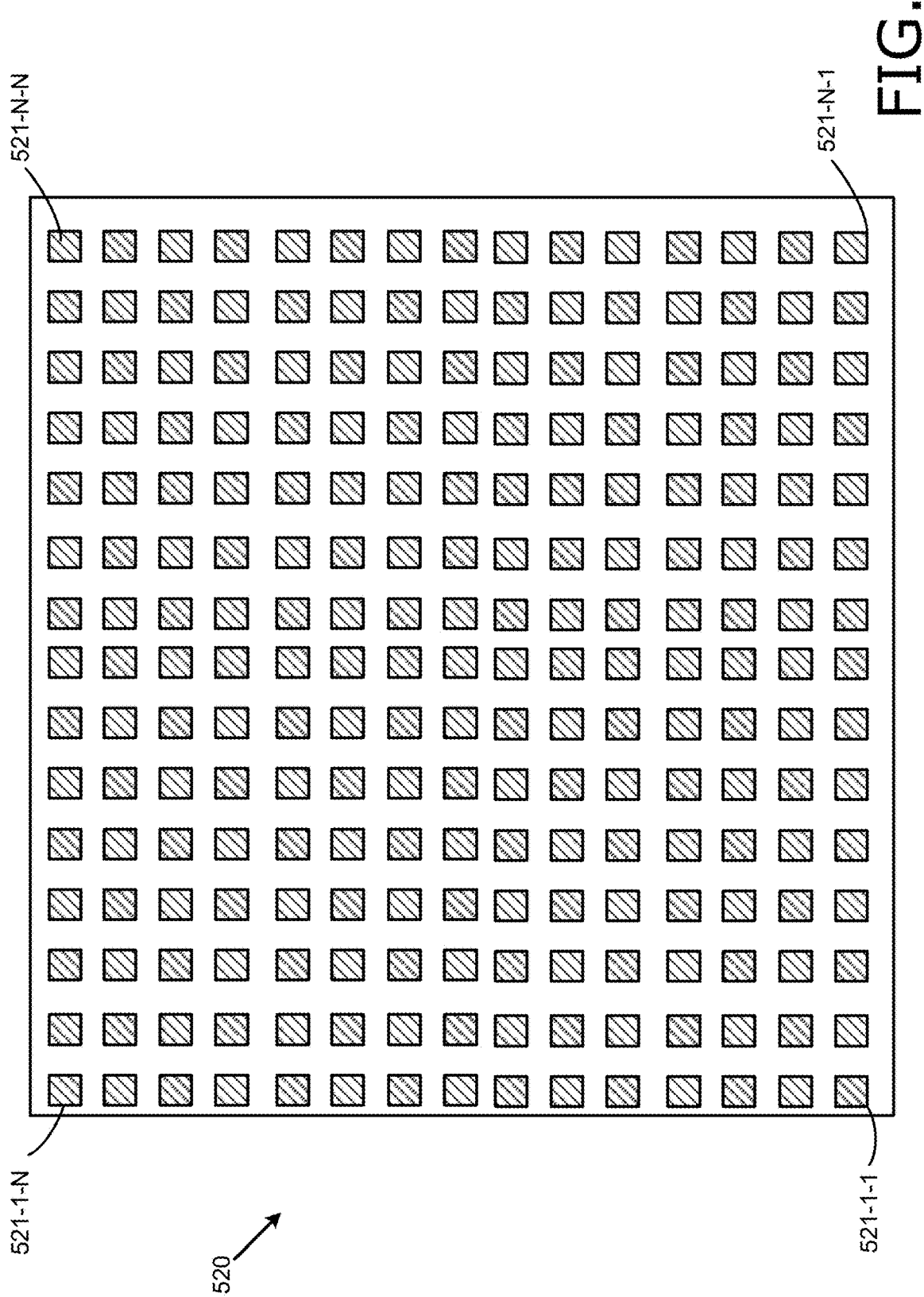

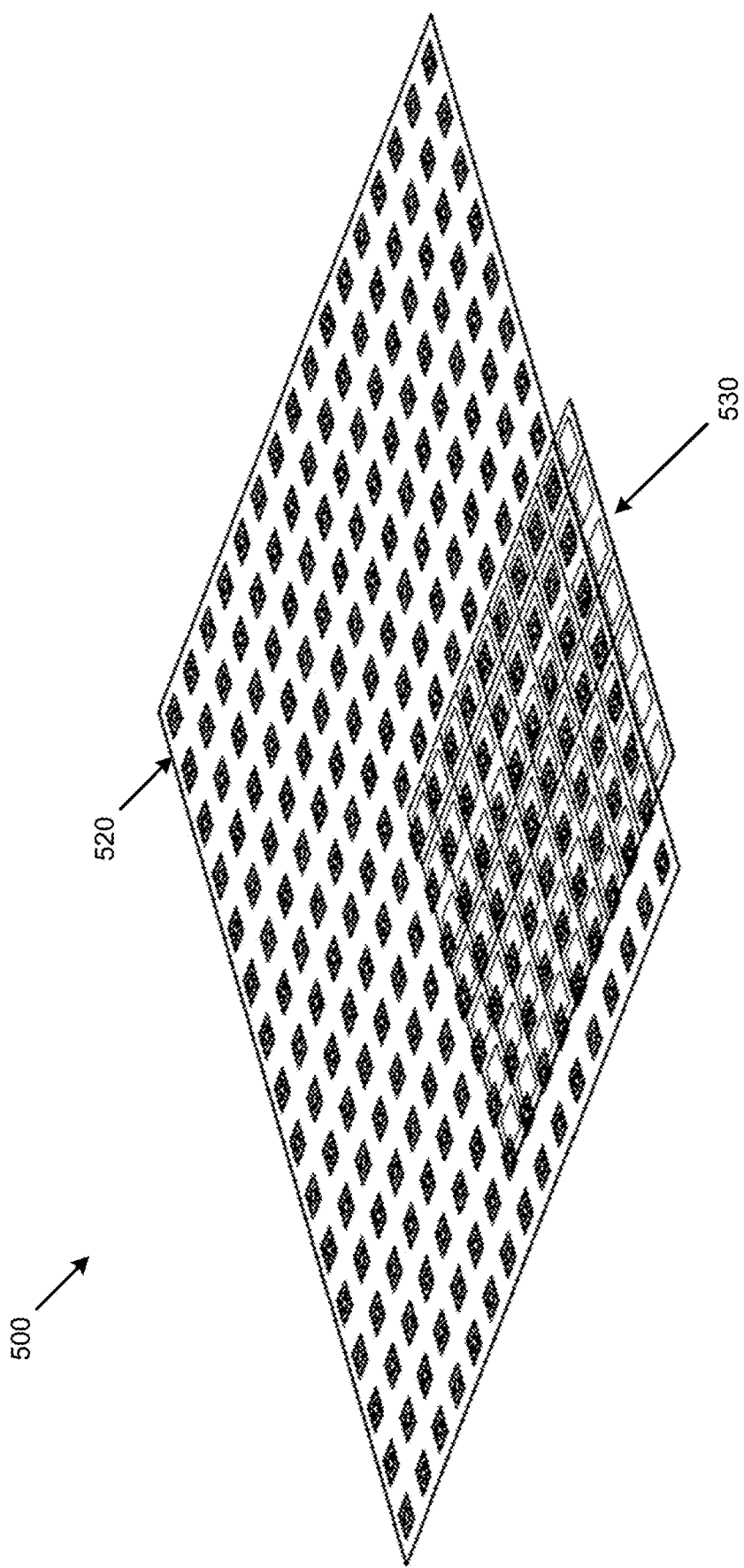

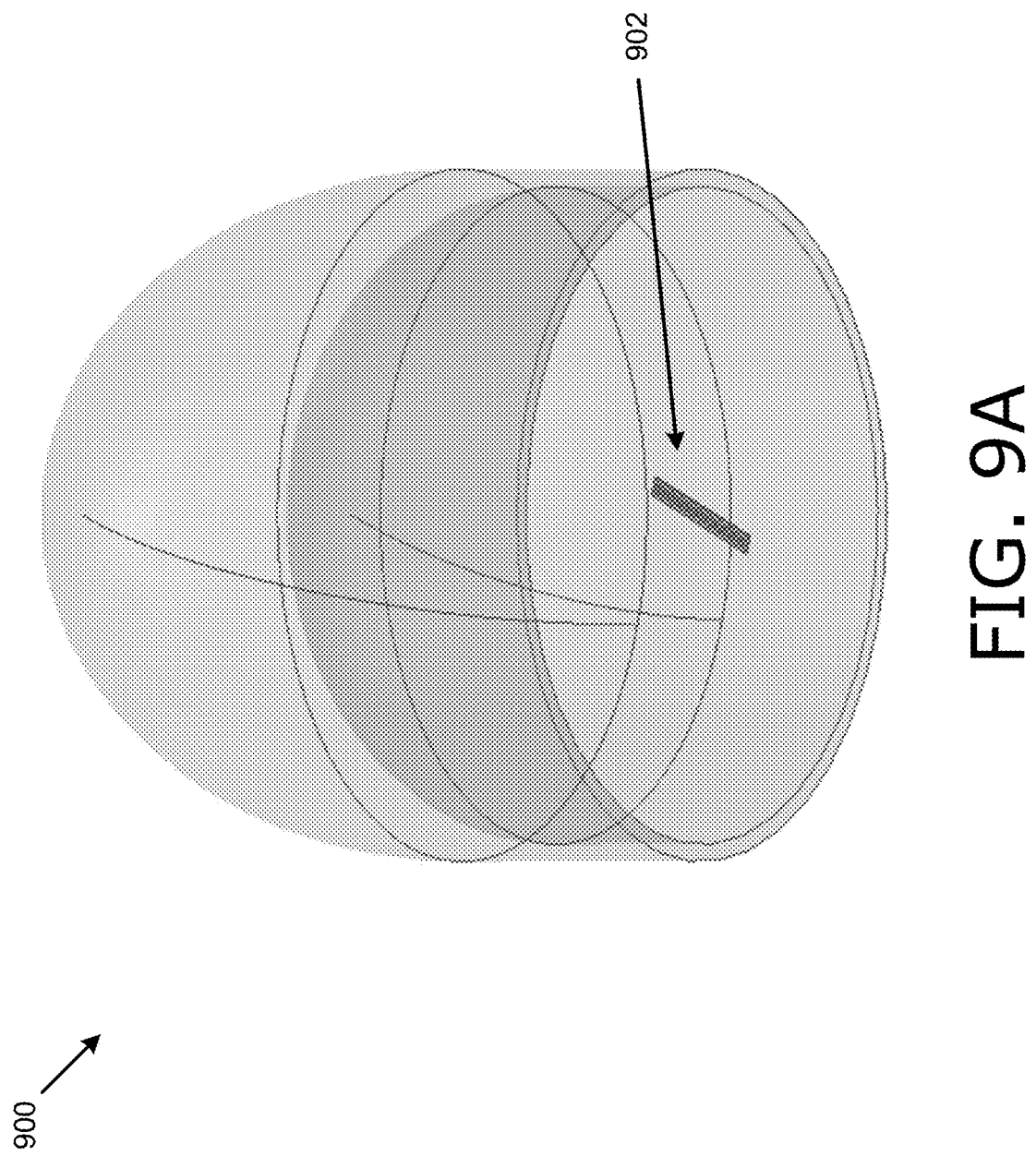

902

PASSIVE MIMO DEVICE

FIELD

The present disclosure relates generally to electronics and wireless communications. For example, aspects of the present disclosure relate to passive multiple-input multiple output (pMIMO) devices used in communication of wireless electromagnetic signals.

BACKGROUND

Wireless communication devices and technologies are becoming ever more prevalent. Wireless communication devices generally transmit and receive communication signals. A communication signal is typically processed by a variety of different components and circuits. In some modern communication systems, many different wavelengths of electromagnetic waves can be used in a single device. Some environments can include areas where wireless signals are reflected or occluded by buildings or objects in the environment. Providing a consistent signal strength in such environment can involve additional complexity in a wireless communication system.

SUMMARY

Various implementations of systems, methods and devices within the scope of the appended claims each have several aspects, no single one of which is solely responsible for the desirable attributes described herein. Without limiting the scope of the appended claims, some prominent features are described herein.

In some aspects, passive multiple-input multiple output (MIMO) surface (pMIMO) devices are described. Such devices can be used to relay signals from base stations to user devices in a portion of a coverage area that may otherwise be unable to receive a system signal. Aspects described herein include beam forming structures, such as lenses and Butler matrixes along with transmission line-based switches, to receive a signal and redirect or "reflect" the signal from the pMIMO surface (e.g., the surface or surfaces for the array of antennas in the pMIMO) to a desired location. Such pMIMOs can passively relay the communication signal (e.g., redirect the signal without directly amplifying the signal or signal components in the pMIMO).

In one aspect, a wireless communication apparatus is provided. The wireless communication apparatus includes: an array of antennas; a beam forming structure coupled to the array of antennas, wherein wireless signals incident on the wireless communication apparatus at a plurality of angles correspond to respective ports based on operation of the beam forming structure; one or more transmission lines; and a plurality of switches configured to couple the respective ports to the one or more transmission lines. Some such aspects can be configured where the one or more transmission lines each have a first end terminated with a quarter wavelength grounding line; and where the plurality of switches are configured to couple the respective ports to corresponding transmission lines of the one or more transmission lines via the plurality of switches with an initial switch coupled to each corresponding transmission line positioned at a quarter wavelength distance from the first end of the corresponding transmission line, and wherein each switch of the plurality of switches is coupled to the corresponding transmission line at an integer multiple of a half wavelength distance from a corresponding adjacent switch of the plurality of switches.

In some aspects, a wireless communication apparatus is provided. The wireless communication apparatus comprises a first radio frequency (RF) transmission line having a first first terminated with a quarter wavelength grounded transmission line; a first array of antennas including a plurality of antenna elements; a switch array including a corresponding switch for each antenna element of the plurality of antenna elements of the first array of antennas, wherein the corresponding switch for each antenna element is configurable to selectively connect each antenna element to the first RF transmission line, wherein an initial switch of the switch array is coupled to the first RF transmission line at a quarter wavelength distance from a first end of the first RF transmission line, and wherein each switch of the switch array is coupled to the first RF transmission line at an integer multiple of a half wavelength distance from a corresponding adjacent switch of the switch array along the first RF transmission line; and one or more lens elements configured to modify wireless inputs signals to the first array of antennas and to modify wireless output signals from the first array of antennas.

Some such aspects operate where the first RF transmission line further comprises a second end terminated with a quarter wavelength grounded transmission line, and wherein a final switch of the switch array is coupled to the first RF transmission line at the quarter wavelength distance from the second end of the first RF transmission line.

Some such aspects further include control circuitry coupled to the first array of antennas, wherein the control circuitry is configured select a switching configuration with a first selected switch closed for reception of a communication signal via a first selected antenna connected to the first selected switch, a second selected switch closed for transmission of the communication signal via a second selected antenna connected to the second selected switch, and switches of the switch array other than the first selected switch and the second selected switch in an open position.

Some such aspects further include control circuitry coupled to the switch array and configured to direct a wireless communication signal along a selected path without amplification of the wireless communication signal from a first antenna element of the first array of antennas selected as an input, to the first RF transmission line, and to a second antenna of the first array of antennas selected as an output, by selecting an open or closed state for each switch of the switch array.

Some such aspects further include a control antenna coupled to the control circuitry, wherein the control circuitry is configured to receive control instructions from a base station via the control antenna.

Some such aspects further include a wired communication port coupled to the control circuitry, wherein the control circuitry is configured to receive control instructions from a base station via the wired communication port.

Some such aspects operate where the one or more lens elements comprise a single elliptical lens, a single hemispherical lens, a single fisheye lens, or a metamaterial lens positioned to direct input signals to the first array of antennas and to direct output signals from the first array of antennas.

Some such aspects further include a second RF transmission line having a first end terminated with a quarter wavelength grounded transmission line; a second array of antennas; and a second switch array providing the corresponding switch for each antenna element of the second array of antennas; wherein the first array of antennas is linear and positioned along a first line, wherein the second array of antennas is linear and positioned along a second line parallel to the first line, and wherein the one or more lens elements are further configured to direct wireless inputs signals to an antenna element in the second array of antennas and wireless output signals from an antenna element in the second array of antennas.

Some such aspects operate where the second RF transmission line is coupled to the first RF transmission line via an additional switch configurable to allow communication signals received at the first array of antennas to be transmitted via the second array of antennas.

Some such aspects further include: a second RF transmission line having a first end coupled to a ground; a connecting RF transmission line; wherein the first array of antennas comprises at least two rows of antenna elements; wherein the switch array comprises at least two rows of switch elements; wherein a first row of antenna elements is coupled to the first RF transmission line via a first row of switch elements; wherein a second row of antenna elements is coupled to the second RF transmission line via a second row of switch elements; and wherein a second end of the first RF transmission line is connectable to the connecting RF transmission line via a first connecting switch; wherein a second end of the second RF transmission line is connectable to the connecting RF transmission line via a second connecting switch.

Some such aspects further include a first quarter wavelength stub having a first end connected to a ground, wherein the first connecting switch selects between connecting the second end of the first RF transmission line to a second end of the first quarter wavelength stub and the connecting RF transmission line.

Some such aspects operate where the connecting RF transmission line comprises a first end connected to the ground, wherein the first RF transmission line is connectable to the connecting RF transmission line at a quarter wavelength distance from the first end of the connecting RF transmission line.

Some such aspects operate where the connecting RF transmission line comprises a second end connected to the ground; wherein the first RF transmission line is connectable to the connecting RF transmission line at a quarter wavelength distance from the second end of the connecting RF transmission line; and wherein the first RF transmission line is connectable to the connecting RF transmission line at an integer multiple of the half wavelength distance from a connection between the second RF transmission line and the connecting RF transmission line.

Some such aspects further include a plurality of RF transmission lines comprising at least the first RF transmission line, the second RF transmission line, and a third RF transmission line; wherein each transmission line of the plurality of RF transmission lines is connected to a corresponding row of antenna elements of the first array of antennas via a corresponding row of switches of the switch array such that each antenna element is associated with a single switch of the switch array; wherein each transmission line of the plurality of RF transmission lines has a first end coupled to the ground and a second end couplable via corresponding connecting switches to either a corresponding quarter wavelength stub or the connecting RF transmission line; and wherein the corresponding connecting switches attach to the connecting RF transmission line at integer multiples of a half wavelength distance from adjacent corresponding connecting switches.

Some such aspects operate where the control circuitry is configured to create a second passive transmission path using the second RF transmission line, the connecting RF transmission line, and the third RF transmission line to relay a first signal on the second passive transmission path while simultaneously relaying a second signal on the first passive transmission path, such that the first signal and second signal are isolated by the switch array and the corresponding connecting switches.

Some such aspects operate where the one or more lens elements comprises a flat metasurface lens with co-centric loop units.

Some such aspects operate where the first array of antennas comprises between 10 and 30 antenna elements.

In other aspects, a wireless communication apparatus is provided. The wireless communication apparatus comprises a Butler matrix comprising a plurality of antenna ports and a plurality of beam ports; a switch array comprising a corresponding switch coupled to each beam port of the plurality of beam ports; and a radio frequency (RF) transmission line coupled to the switch array, the RF transmission line comprising a first end coupled to ground and a second end coupled to ground, wherein a first switch of the switch array is coupled to the RF transmission line at a quarter wavelength distance from the first end, wherein a second switch of the switch array is coupled to the RF transmission line at the quarter wavelength distance from the second end, and where each switch of the switch array is coupled to the RF transmission line at a half wavelength distance from adjacent switches of the switch array along the RF transmission line.

In other aspects, a method comprising: receiving a control signal at a passive multiple input multiple output (pMIMO) device; configuring a switch array of the pMIMO device to create a passive communication path from a first element of an array of antennas to a second element of the array of antennas via a radio frequency (RF) transmission line, wherein switches of the switch array are positioned along the RF transmission line at half wavelength distances from adjacent switches, and wherein an initial switch at a first end of the RF transmission line and a final switch at a second end of the RF transmission line are positioned at a quarter wavelength distance from a ground coupling at the first end and the second end of the RF transmission line; receiving a wireless data signal at the first element of the array of antennas; passively communicating the wireless data signal from the first element of the array of antennas to the second element of the array of antennas using the passive communication path; and transmitting the wireless data signal using the second element of the array of antennas.

In some aspects, the apparatuses described above can include a computing device implemented in a communication system that includes communications with mobile devices. In some aspects, additional wireless communication circuitry. The summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and embodiments, will become more apparent upon referring to the following specification, claims, and accompanying drawings.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

FIG. 5A is a diagram showing portions of a pMIMO surface device in accordance with aspects described herein.

FIG. 5C is a diagram showing portions of a pMIMO surface device in accordance with aspects described herein.

FIG. 9A illustrates aspects of a lens based pMIMO device in accordance with aspects described herein.

DETAILED DESCRIPTION

Figure 1:
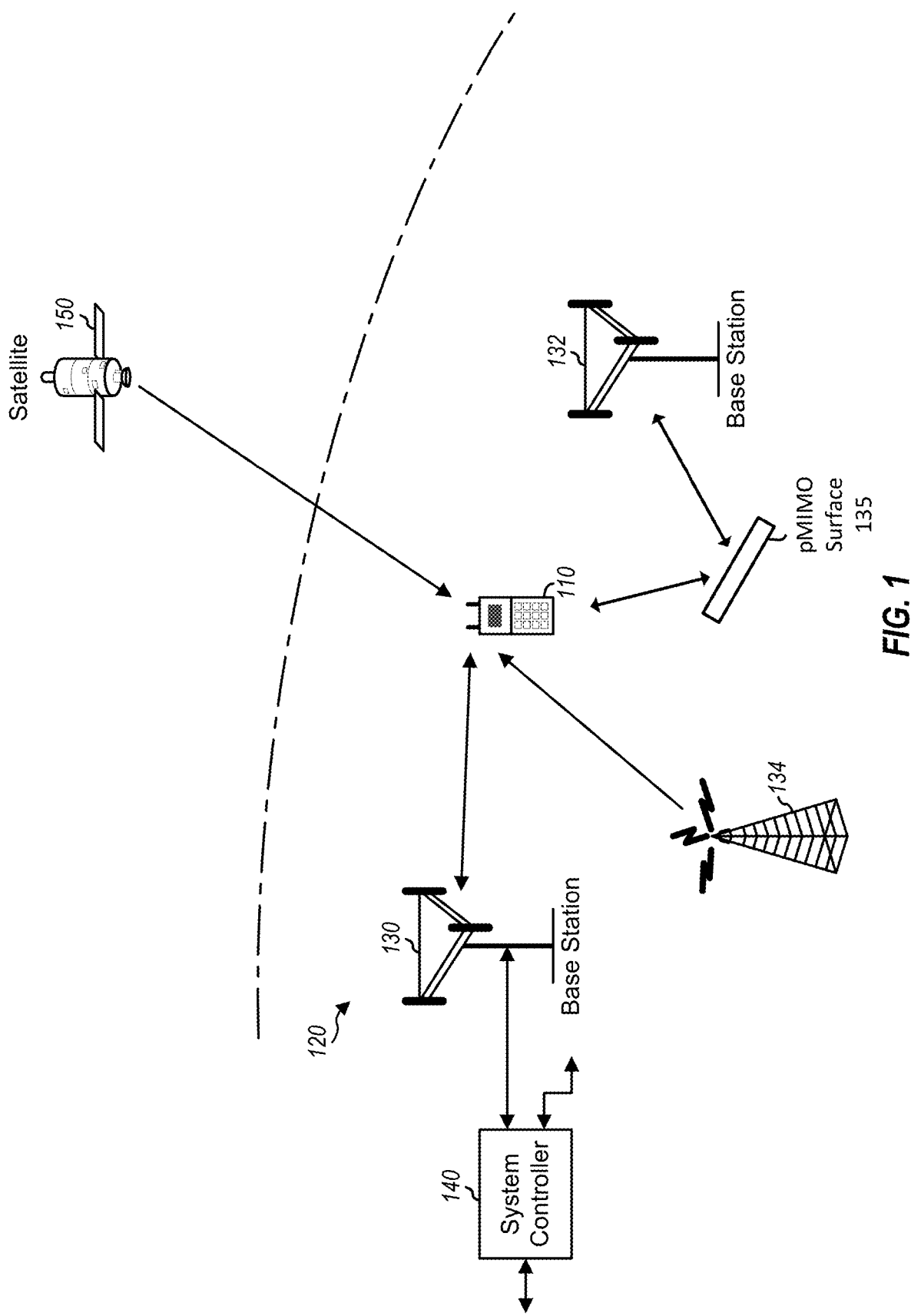
FIG. 1 is a diagram showing a wireless device communicating with a wireless communication system that includes a pMIMO surface device that can be implemented according to aspects described herein.

The detailed description set forth below in connection with the appended drawings is intended as a description of exemplary implementations and is not intended to represent the only implementations in which the invention may be practiced. The term "exemplary" used throughout the description means "serving as an example, instance, or illustration," and should not necessarily be construed as preferred or advantageous over other exemplary implementations. The detailed description includes specific details for the purpose of providing a thorough understanding of the exemplary implementations. In some instances, some devices are shown in block diagram form. Drawing elements that are common among the following figures may be identified using the same reference numerals.

Cellular communication systems use centralized base stations and system controllers to allow mobile devices to send and receive wireless data from a wide variety of locations. Such base stations require significant resources, and certain environments, particularly at higher frequencies, are difficult to cover without blind spots in the communication system due to signal absorption or signal reflections. One solution is to use passive multiple input multiple output (pMIMO) surface devices. Such devices are considered passive due to the communication signal not being amplified in the pMIMO device. Power consumption in the pMIMO device occurs due to control programming used to direct the reflected communication signal, and so "passive" pMIMO devices consume power, though the power consumption can be reduced compared with active devices that amplify the communication signal. Existing pMIMO devices can use varactors, pin diodes, radio frequency (RF) switches, microelectromechanical systems (MEMS), and other such elements to implement programmable phase shifters which can be controlled to relay a wireless signal. Such existing pMIMO devices, however, use large numbers of phase shifter components resulting in high power consumption, high component cost, and complex architectures which can involve hundreds or thousands of components. Additionally, beam direction using pMIMO devices involves component control (e.g., programming of switches and other components), and program execution time can be problematic or resource intensive in low latency systems with large numbers of programmable elements. In some such systems, end-to-end latency targets can be as low as 5 milliseconds (ms), which can result in associated delay budgets for individual interfaces (e.g., the delay budget for a pMIMO device) being as low as 1 ms. In this context, MIMO does not imply that multiple inputs and outputs at the same time are required, but rather that multiple input and/or output angles are possible and may be selected.

Aspects described herein include pMIMO devices that leverage beam forming structures, such as lens elements and/or Butler matrixes along with RF transmission line-based switching paths. Aspects described herein reduce the number of components used when compared with prior pMIMO devices, resulting in a reduced complexity of the control architecture and corresponding reduction in programming times for a given control circuitry architecture. Additionally, some aspects can enable or simplify hardware based Direction of Arrival estimation for a device in a communication system given the consistent delay characteristics of the selectable paths implemented with RF transmission lines. Such Direction of Arrival estimates can be used where each antenna port corresponds to a beam direction, with antenna ports equipped with power sensors and used to monitor Direction of Arrival with power levels detected at the power sensors, and aspects described herein can reduce the hardware used for such functionality.

FIG. 1 is a diagram showing a wireless device 110 communicating with a wireless communication system 120 that includes a pMIMO surface device 135 in accordance with aspects described herein. The wireless communication system 120 may be a Long Term Evolution (LTE) system, a Code Division Multiple Access (CDMA) system, a Global System for Mobile Communications (GSM) system, a wireless local area network (WLAN) system, a 5G NR (new radio) system, or some other wireless system. A CDMA system may implement Wideband CDMA (WCDMA), CDMA 1x, Evolution-Data Optimized (EVDO), Time Division Synchronous CDMA (TD-SCDMA), or some other version of CDMA. For simplicity, FIG. 1 shows wireless communication system 120 including base stations 130 and 132, a single pMIMO surface device 135, and one system controller 140. In general, a wireless communication system may include any number of base stations, pMIMO surface devices 135, and any set of other network entities.

The wireless device 110 may also be referred to as a user equipment (UE), a mobile station, a terminal, an access terminal, a subscriber unit, a station, etc. Wireless device 110 may be a cellular phone, a smartphone, a tablet, or other such mobile device (e.g., a device integrated with a display screen). Other examples of the wireless device 110 include a wireless modem, a personal digital assistant (PDA), a handheld device, a laptop computer, a smartbook, a netbook, a tablet, a cordless phone, a medical device, a device configured to connect to one or more other devices (for example through the internet of things), a wireless local loop (WLL) station, a Bluetooth device, etc. Wireless device 110 may communicate with wireless communication system 120. Wireless device 110 may also receive signals from broadcast stations (e.g., a broadcast station 134) and/or signals from satellites (e.g., a satellite 150 in one or more global navigation satellite systems (GNSS), etc.). Wireless device 110 may support one or more radio technologies for wireless communication such as LTE, WCDMA, CDMA 1x, EVDO, TD-SCDMA, GSM, 802.11, 5G, etc.

Figure 2:
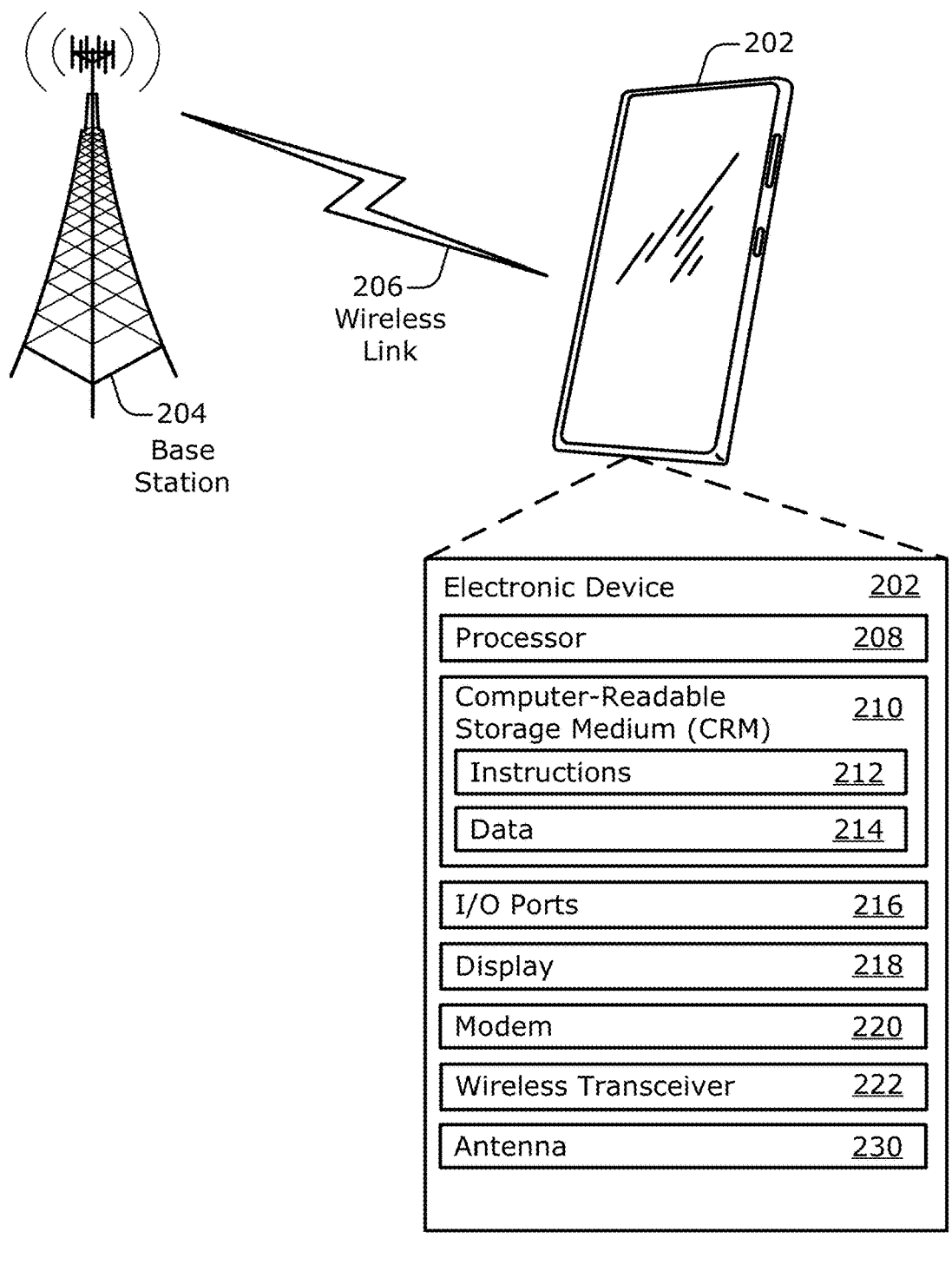
FIG. 2 is a diagram showing a wireless device communicating with a wireless communication system that can be implemented according to aspects described herein.

FIG. 2 is a diagram illustrating an environment 200 that includes an electronic device 202 and a base station 204. The environment 200 can be part of the system 120, the device 202 can be similar to the device 110, and the base station 204 can be similar to the base stations of FIG. 1. In the example of FIG. 2, the electronic device 202 is depicted as a smart phone, however, the electronic device 202 may be implemented as any suitable computing or other electronic device, such as a cellular base station, broadband router, access point, cellular or mobile phone, gaming device, navigation device, media device, laptop computer, desktop computer, tablet computer, server, network-attached storage (NAS) device, smart appliance, vehicle-based communication system, Internet-of-Things (IoT) device, and so forth.

The base station 204 communicates with the electronic device 202 via the wireless link 206, which may be implemented as any suitable type of wireless link. In accordance with aspects described herein, the wireless link 206 can include a pMIMO surface device in accordance with aspects described herein, such as the pMIMO surface device 135. Although depicted as a base station tower of a cellular radio network, the base station 204 may represent or be implemented as another device, such as a satellite, cable television head-end, terrestrial television broadcast tower, access point, peer-to-peer device, mesh network node, router, fiber optic line, another electronic device generally, and so forth.

The wireless link 206 can include a downlink of data or control information communicated from the base station 204 to the electronic device 202 and an uplink of other data or control information communicated from the electronic device 202 to the base station 204. The control information can, in some implementations, include control information for a pMIMO surface device. In such implementations, the control information may not be communicated to the electronic device 202, bur rather may terminate at the pMIMO surface device. The wireless link 206 may be implemented using any suitable communication protocol or standard, such as 3rd Generation Partnership Project Long-Term Evolution (3GPP LTE), 5G New Radio (3GPP 5GNR), IEEE 802.11, IEEE 802.16, Bluetooth™, and so forth.

The electronic device 202 includes a processor 208 and a computer-readable storage medium (CRM 210). The processor 208 may include any type of processor, such as an application processor or a multi-core processor, that is configured to execute processor-executable instructions (e.g., code) stored by the CRM 210. The CRM 210 may include any suitable type of data storage media, such as volatile memory (e.g., random access memory (RAM)), non-volatile memory (e.g., Flash memory), optical media, magnetic media (e.g., disk or tape), and so forth. In the context of this disclosure, the CRM 210 is implemented to store instructions 212, data 214, and other information of the electronic device 202, and thus does not include transitory propagating signals or carrier waves.

The electronic device 202 may also include input/output ports 216 (I/O ports 216) or a display 218. The I/O ports 216 enable data exchanges or interaction with other devices, networks, or users. The I/O ports 216 may include serial ports (e.g., universal serial bus (USB) ports), parallel ports, audio ports, infrared (IR) ports, and so forth. The display 218 can be realized as a screen or projection that presents graphics, e.g.—one or more graphical images, of the electronic device 202, such as for a user interface associated with an operating system, program, or application. Alternatively, or additionally, the display 218 may be implemented as a display port or virtual interface through which graphical content of the electronic device 202 is communicated or presented.

For communication purposes, the electronic device 202 also includes a modem 220, a wireless transceiver 222, and at least one an antenna 230. The wireless transceiver 222 provides connectivity to respective networks and other electronic devices connected therewith using RF wireless signals. Additionally, or alternatively, the electronic device 202 may include a wired transceiver, such as an Ethernet or fiber optic interface for communicating over a personal or local network, an intranet, or the Internet. The wireless transceiver 222 may facilitate communication over any suitable type of wireless network described herein.

The modem 220, such as a baseband modem, may be implemented as a system on-chip (SoC) that provides a digital communication interface for data, voice, messaging, and other applications of the electronic device 202. The modem 220 may also include baseband circuitry to perform high-rate sampling processes that can include analog-to-digital conversion (ADC), digital-to-analog conversion (DAC), gain correction, skew correction, frequency translation, and so forth. The modem 220 may also include logic to perform in-phase/quadrature (I/Q) operations, such as synthesis, encoding, modulation, demodulation, and decoding. More generally, the modem 220 may be realized as a digital signal processor (DSP) or a processor that is configured to perform signal processing to support communications via one or more networks. Alternatively, ADC or DAC operations may be performed by a separate component or another illustrated component, such as the wireless transceiver 222.

The wireless transceiver 222 can include circuitry, logic, and other hardware for transmitting or receiving a wireless signal for at least one communication frequency band. In operation, the wireless transceiver 222 can implement at least one radio-frequency transceiver unit to process data and/or signals associated with communicating data of the electronic device 202 via the antenna 230. Generally, the wireless transceiver 222 can include filters, switches, amplifiers, and so forth for routing and processing signals that are transmitted or received via the antenna 230. Generally, the wireless transceiver 222 includes multiple transceiver units (e.g., for different wireless protocols such as WLAN versus WWAN or for supporting different frequency bands or frequency band combinations).

Figure 3:
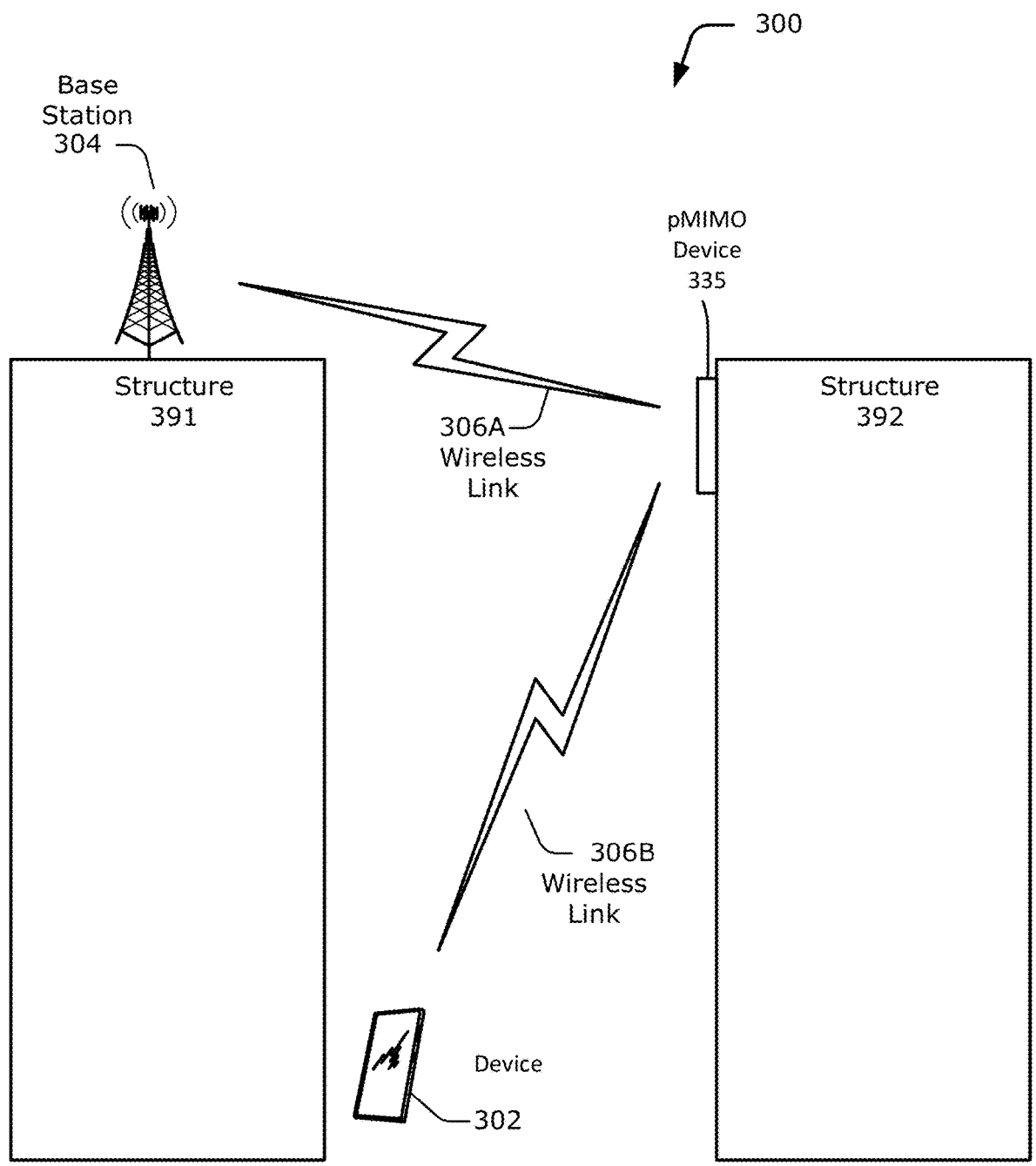
FIG. 3 is a diagram showing a wireless device communicating with a wireless communication system that can be implemented according to aspects described herein.

FIG. 3 is a diagram illustrating an environment 300 that includes an electronic device 302 and a base station 304. Just as for FIG. 2 above, the environment 300 can be part of the system 120, the device 302 can be similar to the device 110, and the base station 204 can be similar to the base stations of FIG. 1. The environment 300 includes structures 391 and 392 that can prevent base station 304 from communicating with the device 302 when the device 302 is located in certain parts of the environment 300. The poor service quality can be due, for example, to structure 391 absorbing signals in the direct path from the base station 304 to the device 302. Use of a pMIMO device 335 can allow a system to provide communication signals to the device 302 with significantly lower resource usage when compared with a second base station or an active relay device. In some aspects, this can occur when the distance from the base station 304 to the pMIMO device 335 (e.g., as a first portion of wireless link 306A) and the signal from the pMIMO device 335 to the device 302 (e.g., as a second portion of wireless link 306B) is roughly similar to the maximum normal service distance of the base station 304 (e.g., due to the passive pMIMO device 335, which can be similar to the device 135, not amplifying the communication signal of the wireless link 306A and 306B). In other aspects, the pMIMO surface can extend the range of the cell since the large surface of the pMIMO can introduce passive gain into the system. While the environment 300 is illustrated as including one electronic device 302 and one base station 304, any number of electronic devices and/or base stations may be included. In some examples, the pMIMO device 335 is configured to communicate with several electronic devices 302 and/or several base stations 304 simultaneously. Additional details of pMIMO device operation in accordance with aspects described herein including separate Butler matrix and/or lens configurations are described below.

Figure 4:
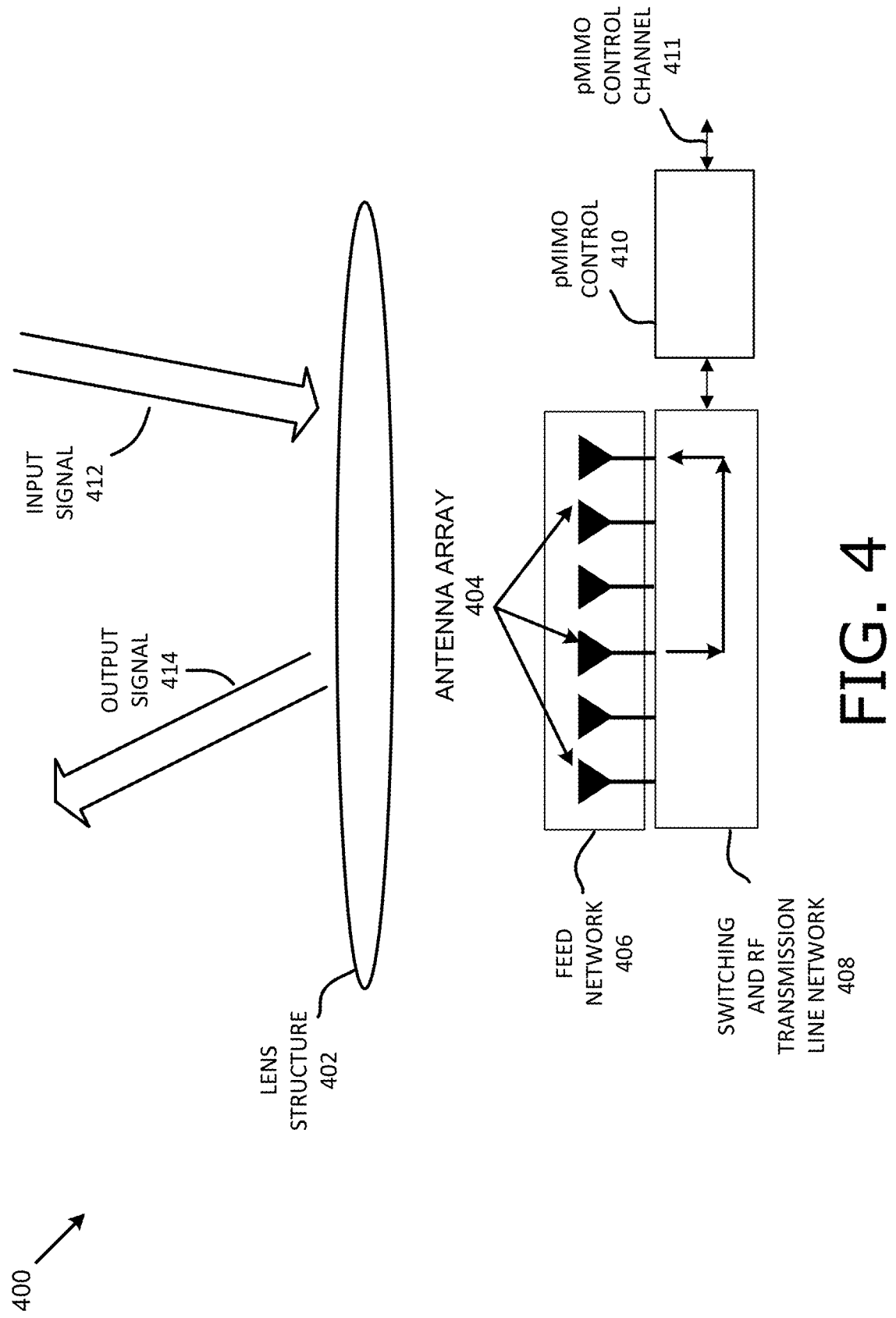
FIG. 4 is a diagram showing portions of a pMIMO surface device in accordance with aspects described herein.

FIG. 4 is a diagram showing portions of a pMIMO device 400 in accordance with aspects described herein. The pMIMO device 400 of FIG. 4 includes a lens structure 402, which can include one or more lens elements. Other aspects described herein can be configured without a lens structure, for example, by using a Butler matrix for beamforming. Some aspects can use an array of lenses, while other aspects can use a single lens structure. Additional details of different examples of lens structures that can operate as the lens structure 402 or aspects with other beamforming structures are described below.

During operation, the pMIMO device 400 can be controlled to direct a signal to a specific device, such as the device 302, as the device moves around in an area covered by an output range of the pMIMO device 400. The pMIMO device 400 provides the signal to the device by using different antenna elements of an array of antennas 404 to receive an input signal 412 via the lens structure 402, and to generate the appropriate output signal 414 to match a current position of a target (e.g., receiving device). In other aspects, the pMIMO device 400 receives transmissions from a device such as the device 302 and provides the transmissions to another device (e.g., a base station or access point).

As part of this operation, different antenna elements of the array of antennas 404 can be associated with different physical positions or with different angular directions, so that as a device moves, different antenna elements of the array of antennas 404 are used to appropriately receive the input signal 412 and/or send the output signal 414. For an initial communication when a pMIMO is first used for a given device, control signals are received via pMIMO control channel 411 and used by pMIMO control circuitry 410 to set switches in switching and RF transmission line network 408 to match an initial position of a device. In some implementations, such control signals can be communicated by a separate control antenna using separate communication circuitry (e.g., outside the signals relayed by the pMIMO device). In other aspects, signals received at antenna arrays which relay received signals for transmission can additionally be used for receiving control signals. In some such aspects, any switching network described herein can include a switching path to relay a control signal to control circuitry of the pMIMO device (e.g., during a predefined control timing window). Such control circuitry can then be used to dynamically configure the pMIMO switches for wireless signals indicated by the control signal. For example, an initial wireless communication may be from a base station to a UE, where the third antenna element from the left of a one-dimensional array of antennas (e.g., the array of antennas 404) receives the signal and the rightmost antenna element is associated with a current position of the device. The control circuitry 410 will receive control data identifying these locations and determining the appropriate antenna elements for the communication and will then connect the switches for an array of antennas elements associated with the input signal 412 and the output signal 414. The control data may be received over an antenna separate from the array of antennas 404 or over a wired connection. In some examples, receipt and/or processing of the control data may be performed by a processor, CRM, modem, wireless transceiver, and/or antenna similar to those discussed above with respect to the electronic device 202 in FIG. 2.

The wireless communication input signal 412 will pass through the lens structure 402 and be received at an element of the array of antennas 404. For example, the lens may focus the input signal 412 onto a particular element of the array of antennas 404 determined by a direction from which the input signal 412 is received. The input signal will then pass to a corresponding antenna feed, and across a closed switch to an RF transmission line of the switching and RF transmission line network 408. The signal will travel along the RF transmission line to the switch corresponding to the antenna element used to transmit to a current position of the device, across the switch and feed of the feed network 406 to the corresponding antenna element of the array of antennas 404, and be radiated as the output signal 414. The lens structure 402 will shape the output signal 414 (e.g., toward a particular direction), which then propagates to the target device. Switches associated with the antenna elements not in use will be open, to isolate the antenna elements not associated with the current communication from the RF transmission line.

As the target device moves, the corresponding antenna elements of the array of antennas 404 change. The pMIMO control channel 411 can be used to receive control data from a system (e.g., from the base station 132 or the system controller 140) to indicate control data used to set switching structures in the pMIMO device 400. For example, the control data may include the locations and/or directions of a base station and electronic device, and a processor in the pMIMO control 410 may determine which switches in the switching and RF transmission line network 408 to close based on the control data and send instructions to set the appropriate switching structures. In some aspects, the pMIMO surface can include a separate control antenna configured to receive control data used to set switches within the pMIMO device. In other aspects, a wired connection between a wired communication port of the pMIMO surface and a base station (e.g., the pMIMO surface 135 and the base station 132) can be used to provide control data to the pMIMO surface 135. In other implementations, the base station 132 and the device 110 can provide control data to the pMIMO surface using the same wireless path that is used for data communications between the device 110 and the base station 132 (e.g., with control data from the base station 132 or the device 110 indicating the output angle associated with the communication path).

FIG. 5A is a diagram showing portions of a pMIMO surface device in accordance with aspects described herein. FIG. 5A shows a two-dimensional flat lens 520 that can be used with a pMIMO device such as the pMIMO devices 135, 335, 400, in accordance with various aspects. The lens 520 can, in some implementations, be used as the lens structure 402. While FIG. 4 illustrates a one-dimensional array of antennas, the flat lens 520 of FIG. 5A is configured with a two-dimensional array of lens elements. The flat lens 520 of FIG. 5A includes lens elements 521. In some aspects, the flat lens 520 includes an N×N array of co-centric loop units, shown as elements 521-1-1 through 521-N-N (e.g., such that the flat lens 520 is made up of a plurality of lens elements 521, which may be loop antennas or other such lens elements). While each of the elements 521-N-N are shown as square elements in FIG. 5A, each element 521-N-N can be a loop unit. In other implementations, other such lens structures specific to a set of operating frequencies can be used (e.g., such that the lens 520 is matched to the wireless signal being focused or modified by the flat lens 520). Lens 520 is thus an implementation of a beamforming structure in a pMIMO used to convert spatial angles of input and output signals (e.g., the input signal 412 and the output signal 414) to match antenna element locations in an array of antennas (e.g., the feed network 406 locations for the array of antennas 404).

Figure 5B:
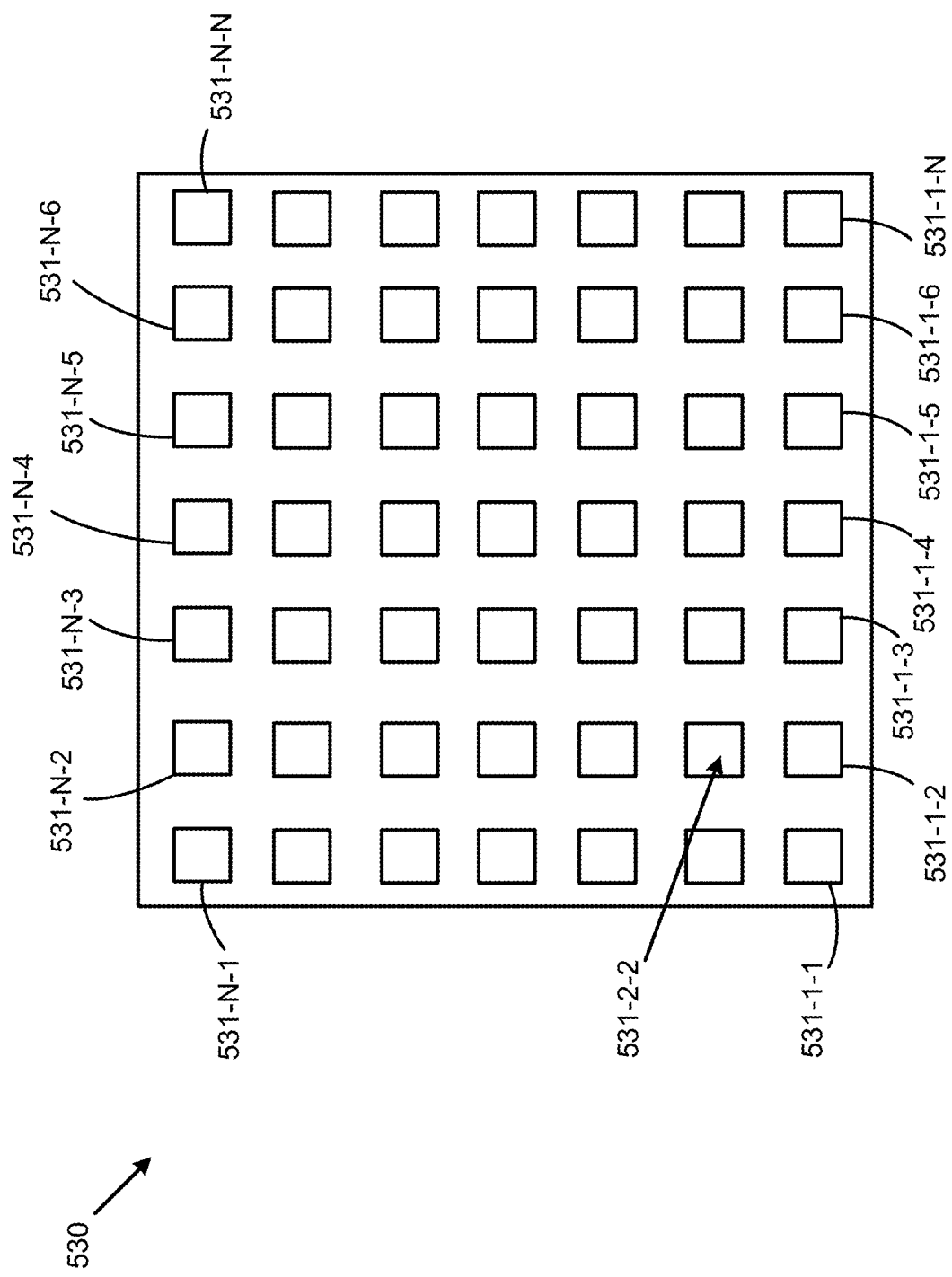
FIG. 5B is a diagram showing portions of a pMIMO surface device in accordance with aspects described herein.

FIG. 5B is a diagram showing portions of a pMIMO surface device in accordance with aspects described herein. FIG. 5B illustrates an array of antennas 530 that can be used with the flat lens 520 of FIG. 5A in a pMIMO device. The array of antennas 530 includes antenna elements of the array of antenna elements 531 in rows 1 through N and columns 1 through N, illustrated as elements 531-1-N through 531-N-N. While FIGS. 5A and 5B illustrate an example with a given number of elements, other numbers of elements can be used. In many implementations, however, the number of lens elements (e.g., elements 521-N-N) will be greater than the number of antenna elements (e.g., elements 531-1-1 through 531-N-N) to achieve the benefits described herein. In some implementations, the number of antenna elements may be between 16 and 100. In some implementations, fewer antenna elements can be used where a limited number of directions are expected for wireless communication paths (e.g., due to the geometry of available UE positions and base stations communicating with the UE positions). Some aspects may use more antenna elements, at a cost of more complex switching controls. Additional details of the function of a pMIMO with a two-dimensional array of antennas are described further below, with specific aspects described with respect to FIGS. 6 and 7B. The spacing between the antenna elements is determined by the lens dimensions and the beam resolution of a given pMIMO device.

FIG. 5C is a diagram showing portions of a pMIMO device 500 in accordance with aspects described herein. FIG. 5C illustrates the array of antennas 530 relative to the lens 520 in accordance with some aspects. As illustrated, the lens 520 includes an array of lens elements that does not match the elements of the array of antennas 530. The lens 520 is used in beamforming incident signals and outgoing signals to improve the coverage area for the pMIMO device 500 as well as to improve the energy transferred to the array of antennas 530.

Because the pMIMO is functionally "reflecting" a wireless communication signal, the lens 520 is a two-way beamforming surface used to both beamform incoming wireless signals to convert the incoming spatial angle to a particular feed point area of the array of antennas, as well as to convert signals radiated from antenna elements to particular spatial angles. In this structure, different antenna elements of the array of antennas 530 are associated with specific spatial angles due to a fixed association created by the lens 520. Additionally, as a passive device, limited signal loss in the lens 520 provides improved performance for both input and output signals, and so bi-directional lens structures with limited loss are used. The pMIMO operates by receiving a signal at a first incident angle and beamforming the signal using the lens 520 (e.g., with transformation or signal focusing effects determined by the arrangement of the lens elements 521). The beamformed signal is received at antenna elements 521 of the lens 520 and directed to a particular antenna element 531 of the array of antennas 530 based on the beamforming that occurs due to the lens 520. The received beam excites the antenna element corresponding to the incident angle (e.g., and a corresponding position or area associated with a device by control data). Power from the signal received at the first incident angle is transferred from the antenna through the switching network to the antenna element that corresponds to the output incident angle set by the control data (e.g., associated with a target recipient device). The lens 520 then beamforms the signal output from the antenna element to the output incident angle.

Figure 6:
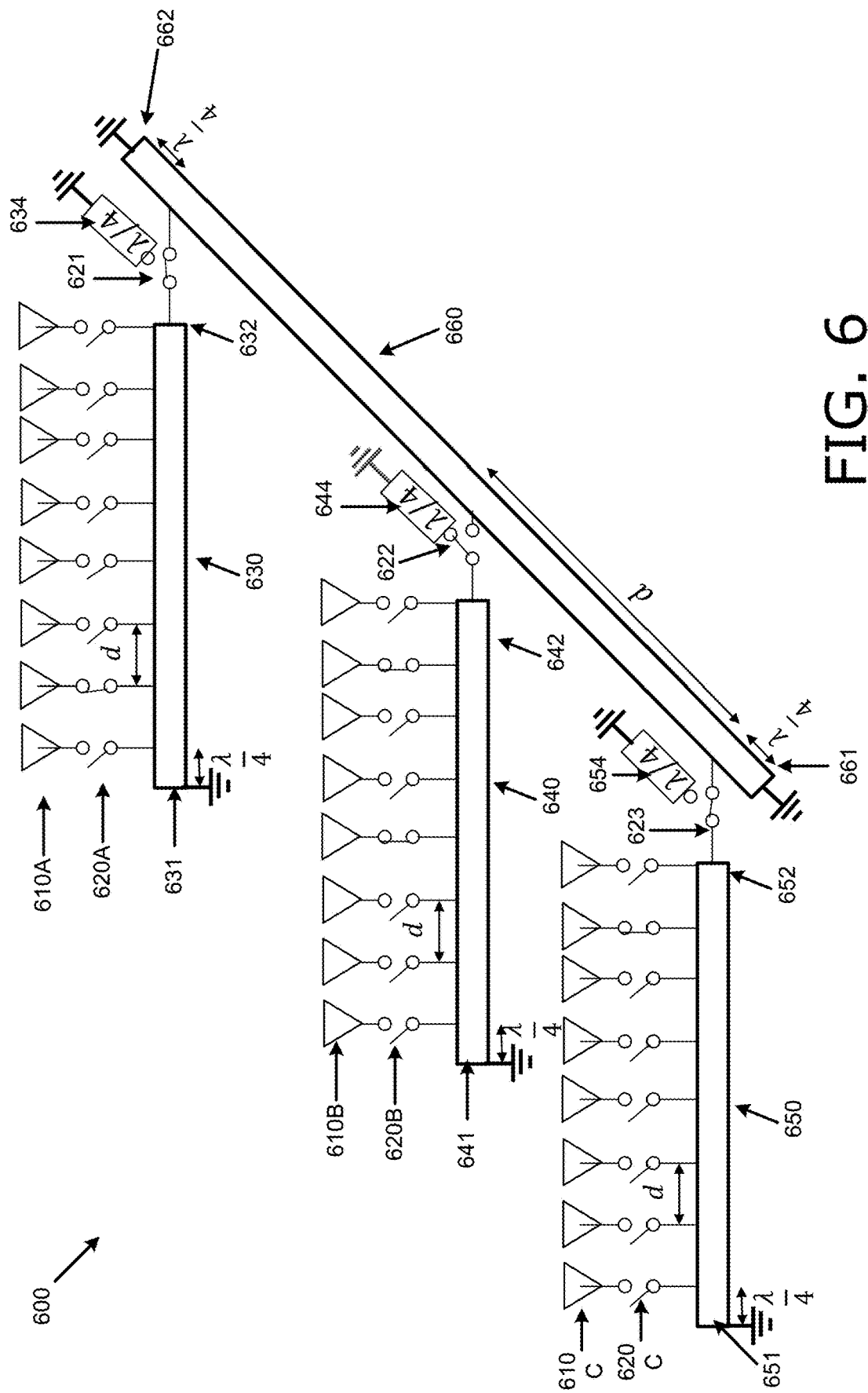
FIG. 6 is a diagram illustrating an array of antennas, transmission lines, and switch array for a pMIMO device in accordance with aspects described herein.

Additionally, while the example of FIG. 5C describes a single lens being used to excite a single antenna array, more complex antenna or lens structures can be used. For example, while a single antenna array is illustrated, in some implementations, a single lens can be used for different groups of incident angles matched to different antenna arrays, such that a single lens can direct signals to different antenna arrays. Similarly, for some implementations, multiple lenses and multiple arrays can be configured in different arrangements to provide similar passive MIMO operations covering different groupings of incident and output angles for different wireless communication paths. Further, while a beamformed signal is directed to a particular antenna element 531 by the lens 520 in an example described above, in some examples the antenna elements 531 are organized into groups with each group having their feeds coupled together, and the beamformed signal may be directed to a group of antenna elements 531 by the lens 520. FIG. 6 is a diagram illustrating an array of antennas, switch array, and transmission lines for a two-dimensional pMIMO device 600 in accordance with aspects described herein. FIG. 6 can be considered a two-dimensional array of antennas similar to the array of antennas 404 (or 530), with a corresponding two-dimensional switching and RF transmission line network similar to the switching and RF transmission line network 408. FIG. 6 illustrates elements corresponding to the array of antennas 404 and the switching and RF transmission line network 408 of FIG. 4. The array of antennas and the switch networks of pMIMO device 600 function to receive a beam from a lens element (e.g., the lens 520) at an antenna element (or group of antenna elements) corresponding to a given area that includes a transmitting device (e.g., the device 110 or the base station 134). Power from the incoming wireless signal received at an antenna element is transferred through a switch, along an RF transmission line, and through an additional switch associated with a second antenna element. The second antenna element corresponds to a desired output direction associated with a location of a receiving device. The pMIMO device 600 thus effectively "reflects" the signal in a controllable direction using the network of switches and transmission lines. For example, a signal can be received at an antenna element of antenna array 610B, travel through switches and transmission lines, and be output at an element of antenna array 610C. Switch configurations allow any antenna element to be connected to any other antenna element with limited power loss. The association of different antenna elements with different spatial directions allows the direction of the "reflected" signal to be controlled, regardless of the input angle. The described operation assumes that the directions are known from control signaling in order to close the correct switches for the antenna elements corresponding to the input and output signal directions, with the remaining switches open to isolate the non-selected antenna elements from the communication signal.

The device 600 of FIG. 6 includes an array of antennas 610 having three rows, shown as row 610A, row 610B, and row 610C of the array of antennas. The device additionally includes a switch array 620 having three rows 620A, 620B, and 620C. The antenna elements of the array of antennas 610 each have a corresponding switch of the switch array 620. Further, RF transmission lines 630, 640, and 650 each correspond to a row of the antenna elements of the array of antennas 610, as well as the corresponding switches of a given row of the switch array 620. Each antenna element in row 610A of the array of antennas 610 is coupled to the RF transmission line 630 via a switch of the row 620A of the switch array 620. The RF transmission line 630 has a first end 631 and a second end 632. The first end 631 is terminated with a quarter wavelength line to ground. The RF transmission lines 640 and 650 similarly have corresponding first ends 641 and 651 terminated with a quarter wavelength line to ground, as well as corresponding second ends 642 and 652. The second ends 632, 642, and 652 are each selectively coupled either to the connecting RF transmission line 660 or a corresponding quarter wavelength stub 634, 644, and 654.

A first antenna element of the array of antennas 610 is attached to the RF transmission line 630 at a quarter wavelength distance from the first end 631 of the RF transmission line. The antenna elements of row 610A are coupled to the RF transmission line via corresponding switches of the row 620A of switch array 620 at positions that are integer multiples of a half wavelength distance from adjacent switches.

As illustrated, a first antenna element of row 610A is coupled to the RF transmission line via a first switch of row 620A at a position that is a quarter wavelength from the first end 631 of the RF transmission line. The second antenna element is coupled via a switch that is an integer multiple of a half wavelength distance ("d") from the attachment point of the first switch. Each subsequent switch is attached at an additional integer multiple of the half wavelength distance along the RF transmission line. The half wavelength positioning from adjacent switch connections and the quarter wavelength distance at the end of the RF transmission line (e.g., which creates a half wavelength distance for reflections that start at the end switch and reflect off the ground reference connection for double the quarter wavelength distance) creates a virtual block that guides the signal towards the right end of the transmission line (e.g., the second end 632). The positioning description recites distances for a particular wavelength, but it will be apparent that communications in a channel for a communication system will function without the system being limited to signals at an exact frequency. System operation can thus be designed with tolerances to accommodate a given communication channel for a communication standard operation described herein.

In single dimension structures (e.g., a 1×N array of antenna elements) with a single RF transmission line, the second end of the RF transmission line is also connected (e.g., terminated) to a ground at the second end as well as at the first end. For two-dimensional structures as described by FIG. 6, the RF transmission line 630 includes connection switch 621 that selectively couples the second end 632 of the RF transmission line 630 to either a quarter wavelength stub 634 or to the connecting RF transmission line 660. If a device 600 is configured to operate with an input and an output signal both occurring at an antenna element of row 610A, then the connection switch 621 couples the second end 632 to the quarter wavelength stub 634, and the switches in the row 620A corresponding the input and output antenna elements are closed. The connection to one end of the quarter wavelength stub with the other end of the quarter wavelength stub connected to ground replicates the operation of a one-dimensional standing wave structure as described herein, such that the last antenna element of the row 610A is coupled to the second end 632 and is a quarter wavelength from the ground due to the position of the connection switch 621. Power from the input signal in such a configuration will reflect off the ground connections at the first end 631 and the second end 632, and will be passed to the selected antenna of the row 610A for transmission. If a signal is input to an antenna element of the row 610A, but output on a different row, then the connection switch 621 connects the second end 632 of the RF transmission line 630 to the connecting RF transmission line 660. Further, a switch of the switch array 620 corresponding to the antenna element in the different row at which the signal is being output is closed.

The connecting RF transmission line 660 has a similar structure to the RF transmission line 630, with the connecting switches 621, 622, and 623 that couple the connecting RF transmission line to RF transmission lines 630, 640, 650 positioned at integer multiples of half wavelength distances from adjacent switches having a connection point to the connecting RF transmission line 660. A first end 661 and a second end 662 of the connecting RF transmission line 660 are each terminated with a quarter wavelength grounded transmission line, so that the nearest connection switch is positioned at a quarter wavelength distance (e.g., so that the reflected signal from the switch connection point travels a half wavelength distance when traveling to and from the ground point, twice the distance of the quarter wavelength position, and so the quarter wavelength grounding acts as an open blocking power flow in the direction of the grounding).

The signal energy thus is transferred from the (receiving) antenna element, to an RF transmission line via a switch, to the connecting RF transmission line, to another RF transmission line, then to a radiating element via a switch. For example, if a control signal indicates a first switch of row 620A two elements from the first end 631 of the RF transmission line 630 is to be closed, and the selected switch two elements from the end 652 of the RF transmission line 650 is to be closed, the rest of the switches remain open. Connecting switches 621 and 623 couple RF transmission lines 630 and 650 to the connecting RF transmission line 660, and connecting switch 622 couples the RF transmission line 640 to the quarter length stub 644. The switch configuration essentially creates a path configured to transfer energy between the two selected antenna elements of the array of antennas, which will correspond to the input angle and output angle for a signal being relayed (e.g., reflected) by a pMIMO device 600. In the described example, energy will be received at the selected antenna element of the row 610A and passed to the RF transmission line 630 via the selected switch of the row 620A (e.g., the switch corresponding to the selected antenna element of the row 610A). The switch position described above creates a guiding path using the RF transmission line 630, the connecting RF transmission line 660, and the RF transmission line 650, with the RF transmission line 640 and the quarter wavelength stubs 634, 644, and 654 isolated from the passive communication path selected by the switch configuration. All other antenna elements other than the selected antenna element of the row 610A and the selected antenna element of the row 610C are also isolated from the passive communication path selected by the switch configuration. The selected antenna element of the row 610C receives power of the input signal from the passive communication path (e.g., transmission line resonance structure for the operating channel wavelength) via the closed corresponding selected switch positioned at the quarter wavelength distance from the first end 651 of the RF transmission line 650. As other devices use the pMIMO or the current devices move, the switching configuration is adjusted to direct the signals to the new locations.

In the operation described above, the RF transmission line 640 is isolated from the passive communication path, with the connecting switch 622 coupling the second end 642 of the RF transmission line 640 to the quarter wavelength stub 644. In some aspects, if devices in a system are appropriately positioned, the RF transmission line 640 can be used for a second passive communication path that operates simultaneously with the first passive communication path above (e.g., using RF transmission lines 630, 640 and the connecting RF transmission line 660). Such a second passive communication path can connect antenna elements within the second row 610B, but cannot connect to other elements outside the second row since the connecting RF transmission line 660 is part of another passive communication path that is actively in use. In another configuration, a second connecting RF transmission line (not illustrated) can be coupled to the first ends 631, 641, 651 of the RF transmission lines 630, 640, 650, via switches selectably couplable to the second connecting RF transmission line or additional quarter wavelength stubs. In such a structure, two simultaneous passive communication paths can be used with each having inputs and outputs on different rows, so long as the two communication paths do not have a shared RF transmission line (e.g., neither the input nor the output of the two paths is in a same row), by having two separate connecting RF transmission lines. Thus, such configuration of the device 600 may enable multiple input signals (e.g., received from different directions or angles) to be routed to respective outputs (for transmission to corresponding "reflected" directions or angles) simultaneously. In other implementations, other such structures can be used, so long as the structure does not generate excessive signal loss.

The spacing between the switch connections at the transmission lines is illustrated as an integer factor of half wavelength distances so that the short circuit terminations of the transmission lines operate as an open circuit at the connected feed points to efficiently transfer power. Aspects described herein use relatively few elements to receive power (e.g., in designs with few simultaneous incident beams). The limited number of beams and associated limited number of elements simplifies operation and limits power use of the pMIMO devices operating in accordance with aspects described herein. The limited number of elements also simplifies control signaling and determination of signal directions for selecting switches and antenna elements associated with the appropriate directions and device positioning (e.g., as illustrated by FIG. 3).

In some implementations, multi-pole switches can be used with additional transmission lines to create additional independent signal paths. Any transmission line of FIG. 6 can be duplicated, with additional poles added to each switch connected to the duplicated transmission line, with the additional poles having similar connections to the new transmission line. For example, the transmission line 630 can be duplicated, with each switch 620 in the switch row 620A having an additional pole to select between connecting an antenna element from the first transmission line, the second transmission line, or an open position (e.g., not connected to any transmission line). The second transmission line allows for pairs of antennas in row 610A to be connected to each other, while having independent transmission paths that don't overlap due to the availability of parallel paths via the two transmission lines and the multi-pole switches. Similarly, the connecting transmission line 660 can be duplicated, with switches 621, 622, and 623 having multi-pole connections to allow for independent signal paths. With such additional transmission lines and multi-pole signal paths, any number of paths can be active simultaneously, so long as all the active paths are isolated from each other.

In some implementations, each antenna is configured to communicate in a plurality of pols (for example a V pol and an H pol, where respective feeds are coupled to each antenna for each pol). These pols may be used to communicate separate streams of data. For example, there may be a set of switches 620 and a set of transmission lines 630, 640, 650, and 660 coupled for each pol. In some examples, this may enable multiple streams of data may be communicated simultaneously between two devices (e.g., the settings of the switches would be the same for both pols). In some examples, this may enable multiple streams of data may be communicated simultaneously between more than two devices. For example, respective streams could be received at an H pol and V pol from a base station, and then sent out through separate antennas to different UEs based on the switched associated with each pol being set differently. As another example, streams on the H pol and V pol may not have any association with each other, and two incoming signals (one on an H pol and the other on a V pol) could be routed independently.

Figure 7A:
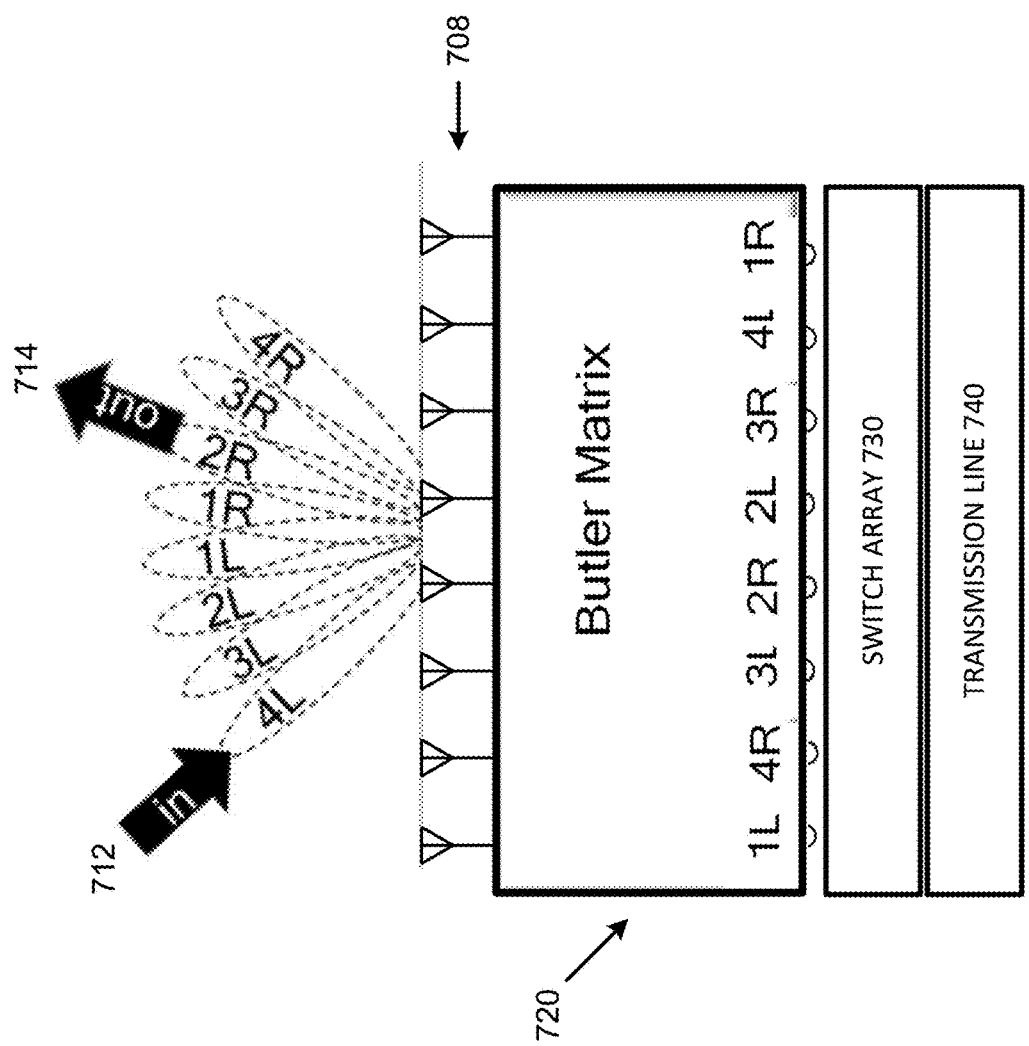
FIG. 7A is a diagram illustrating portions of a Butler matrix based pMIMO device in accordance with aspects described herein.

FIG. 7A is a diagram illustrating portions of a Butler matrix 720 based pMIMO device in accordance with aspects described herein. PMIMO devices using the structure of FIG. 7A operate similarly to the devices described above, but rather than having a lens configured to focus a beam on a particular antenna (or set of antennas) of an antenna array as described in FIG. 4, a Butler matrix is used to convert between a beam at the antenna array and a signal at a particular port. A Butler matrix is a beamforming network used to feed antennas of an array of antennas 708 in order to control the direction of a beam or beams. A Butler matrix can use couplers and (fixed-value) phase shifters to receive and/or transmit signals in a range of directions as illustrated. Similarly, a given configuration will accept a transmitted signal from a given direction. The Butler matrix accepts input power or feeds output power to the elements with a progressive phase difference such that an output beam is directed in a desired direction. The illustrated 8×8 Butler matrix 720 has eight associated directions 4R through 1R and 1L through 4L. Functionally, the structure operates similarly to the structure described above, but rather than a lens structure beamforming signals to map to a position in an array of antennas as described in FIG. 4, the Butler matrix 720 and the array of antennas map the beam to a beam port.

In the illustrated structure of FIG. 7A, signals received at a given angle (e.g., 1L-4L or 1R-4R) generate energy at a corresponding beam port. The beam ports can be treated the same as the antenna elements of FIG. 5B or 6, with a corresponding switch of switch array 730 matched to each beam port of the Butler matrix 720. The switches of the switch array 730 are then coupled along the transmission line 740 at half wavelengths from adjacent switches or at quarter wavelengths from an end of the transmission line 740 to create a guiding path to efficiently transfer energy between the beam ports. Control signaling and circuitry is used to determine which switches to close (e.g., corresponding to angles of directions illustrated in FIG. 7A and associated with devices at different positions involved in a wireless communication), and which switches to open. For example, the switch array 730 may be configured similarly to the switches of the row 620A (or any other row illustrated in FIG. 6), except that the switches are connected to respective beam ports of the Butler matrix 720 instead of being connected to the antennas 610A. Further to this example, the transmission line 740 may be configured similar to the transmission line 630 when the end 632 is coupled to the quarter wavelength stub 634 (but note that the switch 621 may be omitted such that the transmission line is permanently coupled to the stub).

In the example of FIG. 7A, an input signal 712 is received from the direction corresponding to antenna port 4L to be output at the direction corresponding to antenna port 2R. Control signaling indicating the directions is used by control circuitry of the pMIMO to close the switches corresponding to these antenna ports, and to open the remaining switches. Energy associated with the input signal 712 is output to a corresponding switch of switch array 730 at beam port 4L. The energy is then passed to the transmission line 740, and then to the beam port 2R via the corresponding switch of the switch array 730. The Butler matrix then radiates the output communication signal 714 in the direction associated with antenna port 2R. A Rotman lens implementation can, in some aspects be similar to the Butler matrix implementation, as described below with respect to FIG. 8.

Figure 7B:
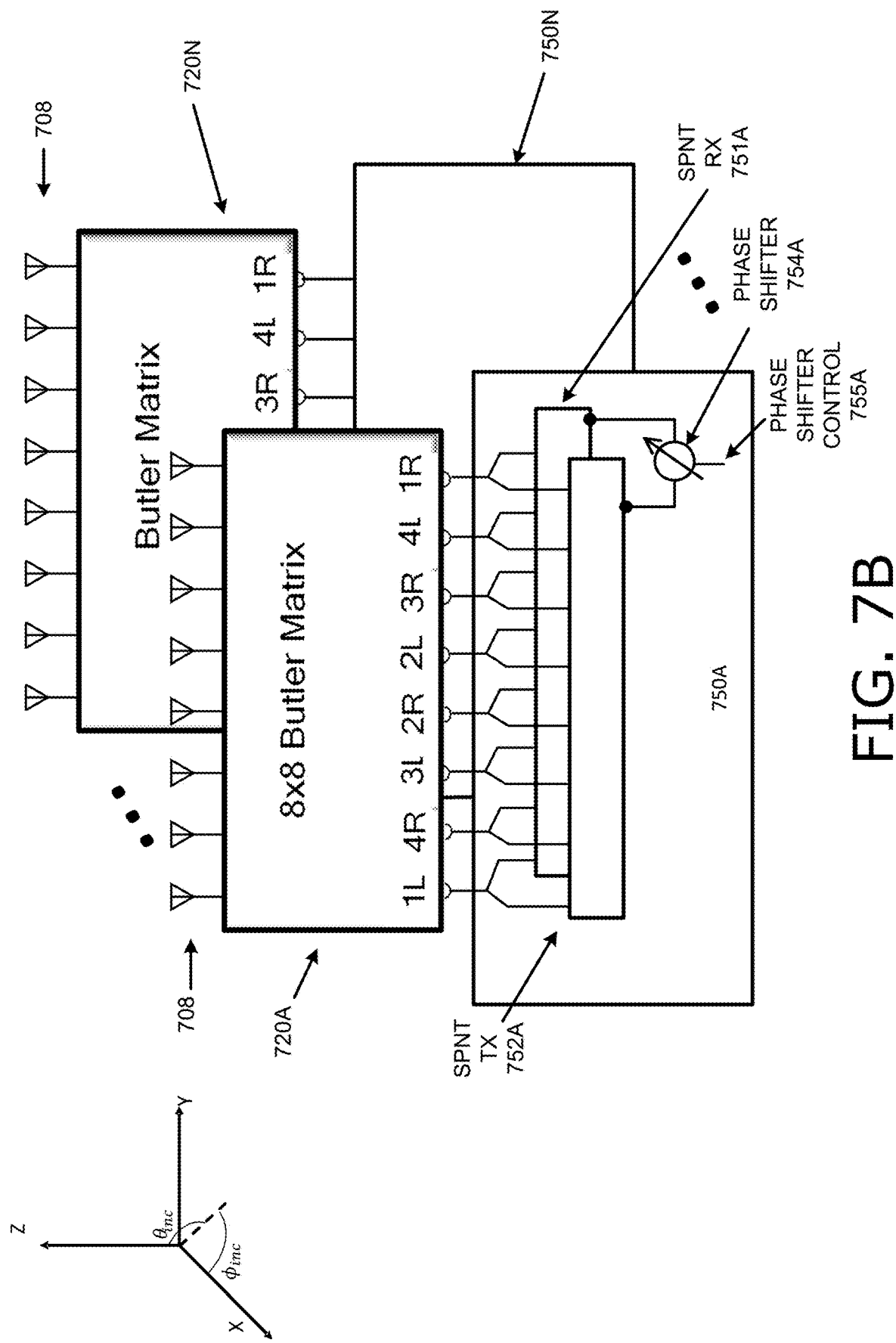
FIG. 7B is a diagram illustrating portions of a Butler matrix based pMIMO device in accordance with aspects described herein.

FIG. 7B is a diagram illustrating portions of a Butler matrix based pMIMO device in accordance with aspects described herein. FIG. 7B illustrates two dimensional scanning using an array of one-dimensional Butler matrixes including Butler matrixes 720A through 720N having an array of antennas 708 (e.g., with each Butler matrix of Butler matrixes 720A through 720N associated with a row of antennas in the array of antennas 708), as well as corresponding one-dimensional switching and phase shifter networks 750A through 750N connected to each corresponding one dimensional Butler matrix of Butler matrixes 720A through 720N.

The illustration of FIG. 7B shows a limited number of antenna elements in the array of antennas 708, but the array of antennas can include any number of antenna elements as described herein (e.g., between approximately 4 and 32 antennas in the array of antennas). In the implementation of FIG. 7B, the one-dimensional switching and RF transmission line network 750A is composed of two SPNT (Single Path N Through) switches shown as SPNT RX switch 751A and SPNT TX switch 752A, as well as a phase shifter 754A coupled between the two SPNT switches 751A and 752A.

Each SPTN of each network 750 includes both a transmission line and a switch array similar to the transmission line 740 and the switch array 730, but with the SPNT RX switch 751A (e.g., which includes a transmission line) and the SPNT TX switch 752A (which also includes a separate transmission line) connected via the phase shifter 754A in a structure similar to the structure of FIG. 6 if the transmission lines were connected via a phase shifter instead of the transmission line 660.

While only the elements of network 750A for the Butler matrix 720A are shown, each of the Butler matrixes 720A through 720N will have corresponding elements in corresponding switching and RF transmission line networks 750A through 750N. During operation, an incoming signal direction ($\theta_{inc}, \varphi_{inc}$) and reflected signal direction ($\theta_{ref}, \varphi_{ref}$) are known (e.g., from a control signal received as part of the device operation). The direction of the incoming beam ($\theta_{beam}^{RX}$) and the associated beam port number (1L, 4R, 3L, ...) can be calculated from $\theta_{beam}^{RX} = \sin^{-1}(\sin\theta_{inc} \sin\varphi_{inc})$. The SPNT RX switch 751A path couples the associated beam port to the phase shifter 754A. The phase shifter 754A applies $n\Delta\psi_{row}$ phase shift on the signal passing through where n is the row number and $$\Delta\psi_{row} = \frac{2\pi}{\lambda} d_x (\sin\theta_{inc}\cos\varphi_{inc} + \sin\theta_{ref}\cos\varphi_{ref}).$$

Finally, the SPNT TX switch 752A connects the output of the phase shifter 754A to the outgoing signal beam port which is obtained by $\theta_{beam}^{TX} = \sin^{-1}(\sin\theta_{ref} \sin\varphi_{ref})$. A control signal input to the phase shifter 754A is shown as the phase shifter control input 755A. A control signal (e.g., generated from a wireless control signal received at the system as part of communication network operation of a passive MIMO device) provided at the phase shifter control input 755A is determined from the known incoming signal direction and reflected signal direction as described above. The phase shifts applied at each of the phase shifters 754A through 754N match the combined signals received at each of the Butler matrixes 720A through 720N to create output wireless signals at each of the Butler matrixes 720A through 720N that combine to create the signal in the reflected signal direction ($\theta_{ref}, \varphi_{ref}$) from the incoming signal received at ($\theta_{inc}, \varphi_{inc}$). As mentioned above, details of switching and RF transmission line network 750A is described, similar configurations can be implemented for each of switching and RF transmission line networks 750A through 750N. While FIG. 7B describes one implementation of aspects of a pMIMO described herein, other similar implementations are possible in accordance with other details described herein, including other switching and RF transmission line networks as well as other antenna and lens structures.

Figure 8:
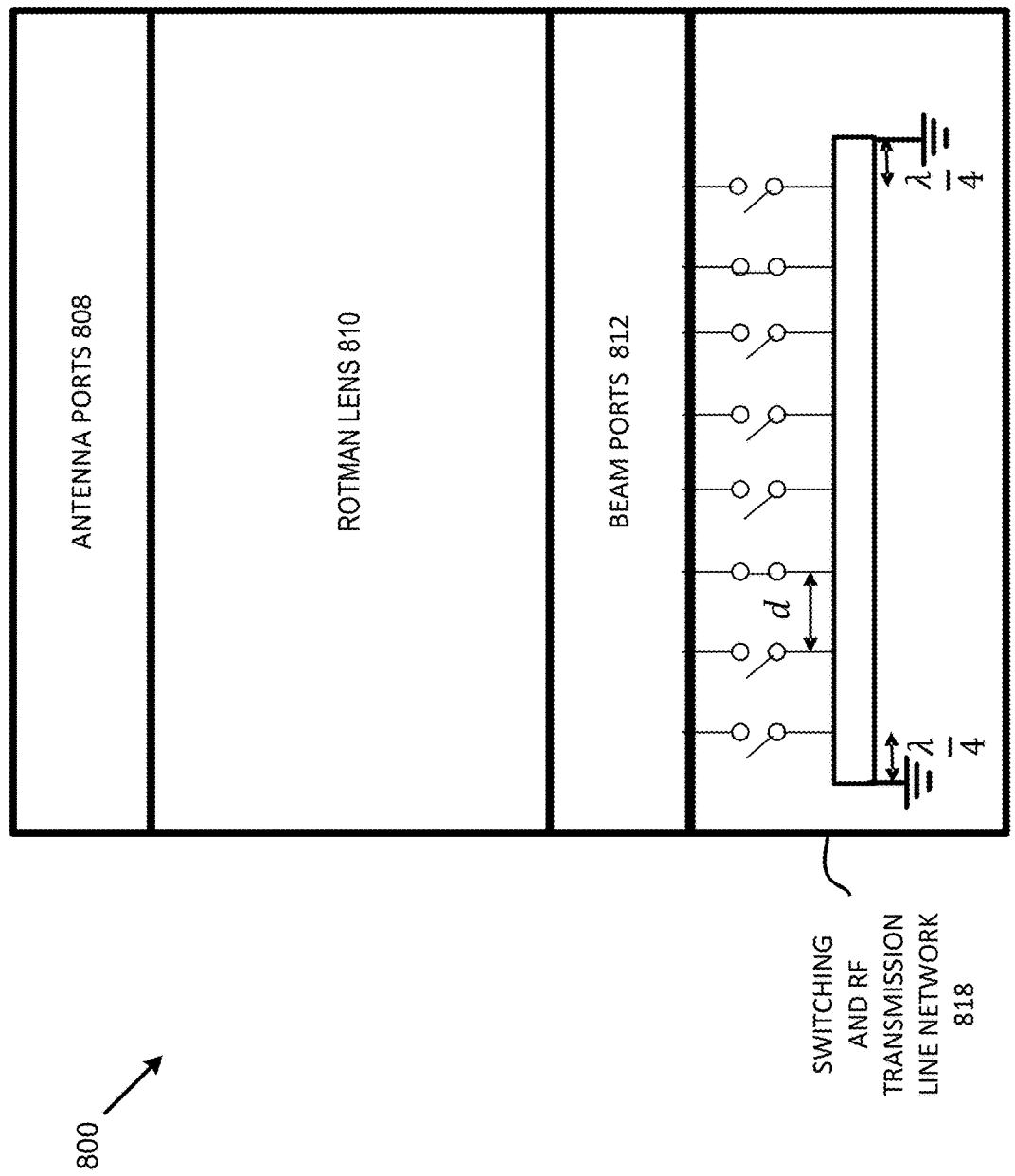
FIG. 8 is a diagram illustrating portions of a Rotman lens based pMIMO device in accordance with aspects described herein.

FIG. 8 is a diagram illustrating portions of a Rotman lens based pMIMO device 800 in accordance with aspects described herein. In some aspects, the one dimensional Butler matrix implementation of FIG. 7A can be considered an implementation of the same concept as the one-dimensional Rotman lens implementation of FIG. 8, with corresponding operating characteristics for the one dimensional switching and RF transmission line network used in each implementation. A Rotman lens is a passive lens-based beamforming network that accepts signals from a plurality of antenna elements at antenna ports 808, and outputs signals on a plurality of beam ports 812. Similar to the Butler matrix based pMIMO of FIG. 7A and the other structures described above, the Rotman lens based pMIMO device 800 of FIG. 8 receives a wireless signal at antenna elements associated with antenna ports 808. Rotman lens 810 structures reflections in the structure of the Rotman lens 810 such that the direction of the output at the beam ports 812 depends on the input direction of an incoming beam received at the antenna ports 808. A high angular resolution can be achieved by using a large number of ports. In some aspects, dummy ports can be used to improve angular resolution, at a cost of signal loss.

Similar to the operation and structures described above, the outputs at beam ports 812 can be functionally compared to the signals received from antenna elements in FIG. 4. Each beam port of the beam ports 812 is matched to a particular switch of switching and RF transmission line network 818, that is structured as described above with half wavelength attachment spacings at the transmission line to generate a standing wave at communication frequencies. Control signaling selects an input and output switch associated with specific beam ports based on knowledge of positions of the two devices (e.g., a UE and a base station such as the device 110 and the base station 132). Energy received from a beam port of the beam ports 812 is transmitted along the transmission line of switching and RF transmission line network 818 as part of a passive communication path. The energy is then input back into the Rotman lens 810 via a port of the beam ports 812 associated with a destination device. The wireless communication signal is output at antenna ports 808 as a signal directed to a location determined by the control signaling and circuitry as a reflection of an input signal generated by the pMIMO device 800. A two dimensional array of antennas may be implemented by coupling multiple Rotman lenses together similar to how the multiple Butler matrixes are coupled together in FIG. 7B.

FIG. 9A illustrates aspects of a lens based pMIMO device in accordance with aspects described herein. FIG. 9A includes a lens 900 and an array of antennas 902 that can be used in a pMIMO device in accordance with aspects described herein. As described above, single dimension pMIMO devices can be used to transmit and receive signals along a single axis with selectable incidence angles. Lens structures such as lens 900 can be used to enhance the available range of areas covered by a pMIMO. Lens 900 can, for example, be an implementation of the lens structure 402. Lens 900 and array of antennas 902 can be used with any structure described herein, including the Rotman lens structure, the Butler matrix structure, or a simple antenna feed structure. In some aspects lens 900 can be combined with a flat lens structure such as lens 520. In other aspects other such lens structures can be used, such as an elliptical lens structure, a spherical lens structure, a fisheye lens structure, or any other such lens structure that can be used to translate incident communication signals to corresponding antenna feeds of a pMIMO device.

Figure 9B:
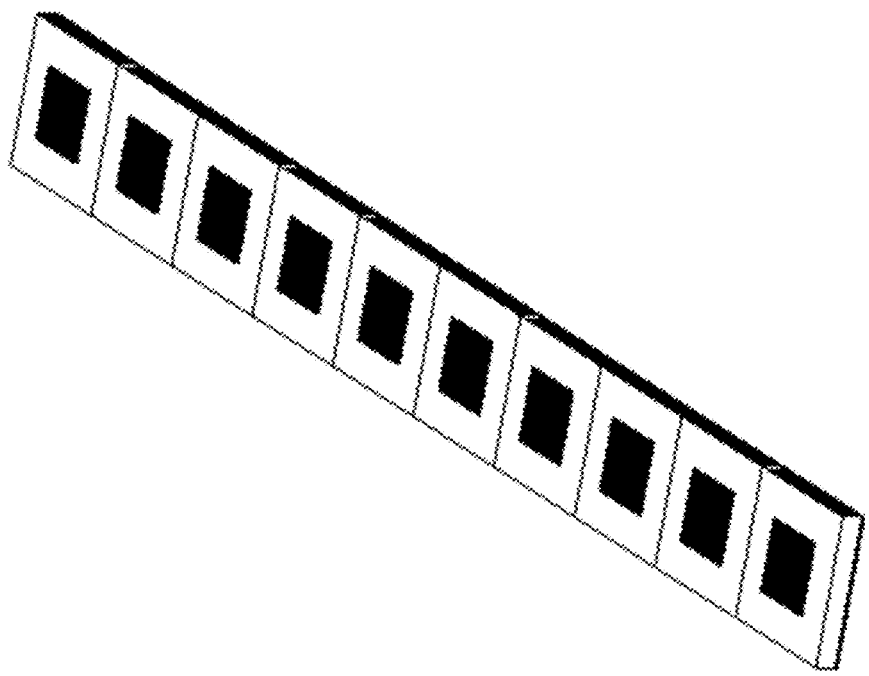
FIG. 9B illustrates aspects of an array of antennas for a pMIMO device in accordance with aspects described herein.

FIG. 9B illustrates aspects an array of antennas 902 for a pMIMO device in accordance with aspects described herein. FIG. 9B shows the array of antennas 902 of FIG. 9A, which can be used with a lens 900 or other such lenses. The array of antennas 902 is a simple 1×N one-dimensional array. In some aspects, two such one-dimensional arrays can be used with lens structures to provide two degrees of freedom in receiving and transmitting wireless signals.

Figure 10:
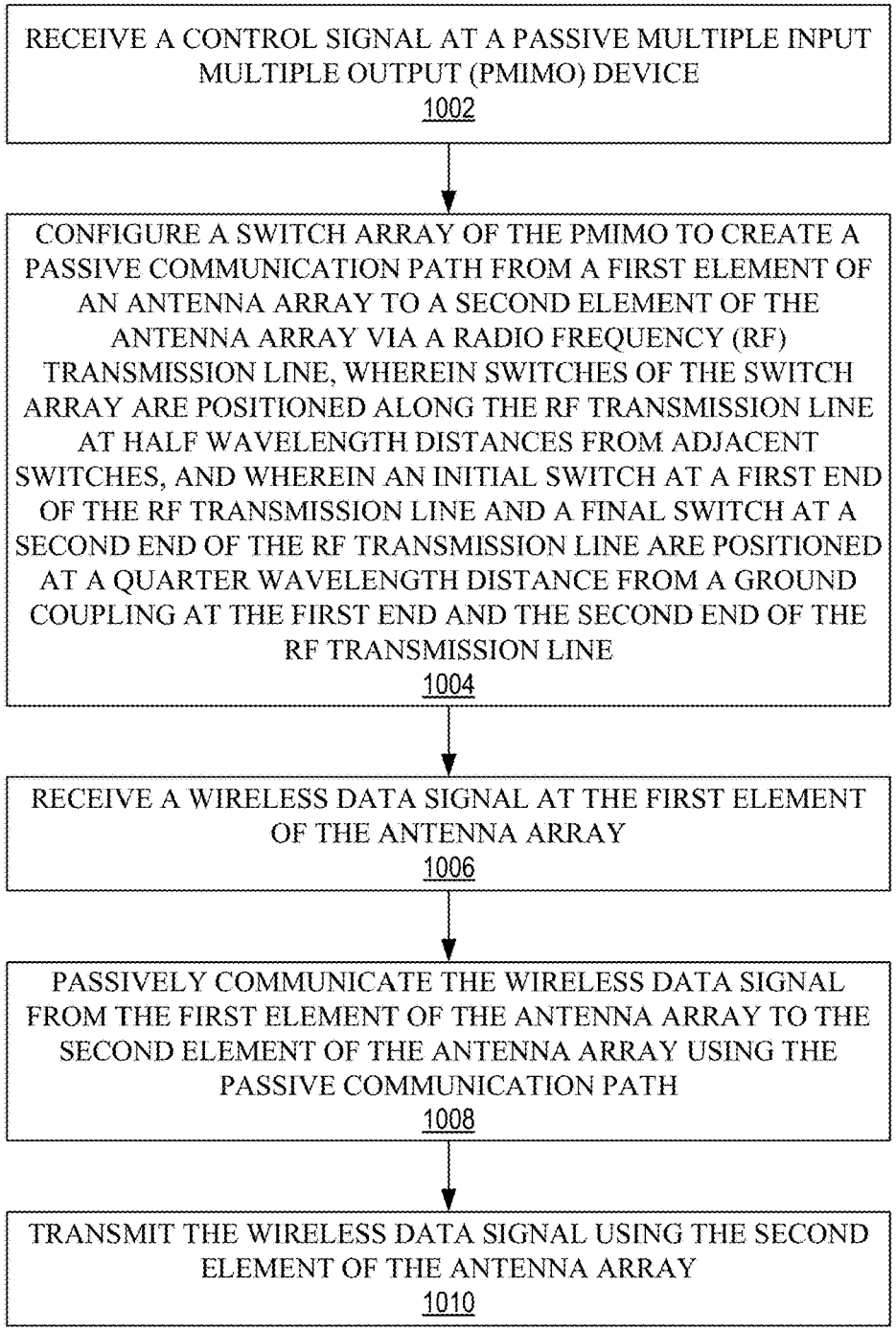
FIG. 10 illustrates aspects of a method for operating a pMIMO device in accordance with aspects described herein.

FIG. 10 is a flow diagram describing an example of the operation of a method 1000 for operation of a pMIMO device in accordance with aspects described herein. In some aspects, the described operations can be performed by a device including a memory and processing circuitry coupled to the memory and configured to perform the operations of the method 1000. In some aspects, the method 1000 can be embodied as instructions stored in a non-transitory computer readable storage medium that, when executed by processing circuitry (e.g., control circuitry) of a device, cause the device to perform the operations of method 1000 described below. The blocks in the method 1000 can be performed in or out of the order shown, and in some embodiments, can be performed at least in part in parallel.

Method 1000 includes block 1002, which involves receiving a control signal at a passive multiple input multiple output (pMIMO) device Method 1000 includes block 1004, which involves configuring a switch array of the pMIMO to create a passive communication path from a first element of an array of antennas to a second element of the array of antennas via a radio frequency (RF) transmission line, wherein switches of the switch array are positioned along the RF transmission line at half wavelength distances from adjacent switches, and wherein an initial switch at a first end of the RF transmission line and a final switch at a second end of the RF transmission line are positioned at a quarter wavelength distance from a ground coupling at the first end and the second end of the RF transmission line.

Method 1000 includes block 1006, which involves receiving a wireless data signal at the first element of the array of antennas.

Method 1000 includes block 1008, which involves passively communicating the wireless data signal from the first element of the array of antennas to the second element of the array of antennas using the passive communication path.

Method 1000 includes block 1010, which involves transmitting the wireless data signal using the second element of the array of antennas.

Method 1000 can additional include repeating blocks or intervening blocks in accordance with any description or device operation provided herein, and can additional include operation of related devices or duplicated devices which similarly perform pMIMO communication operations in accordance with any description provided herein.

Figure 11:
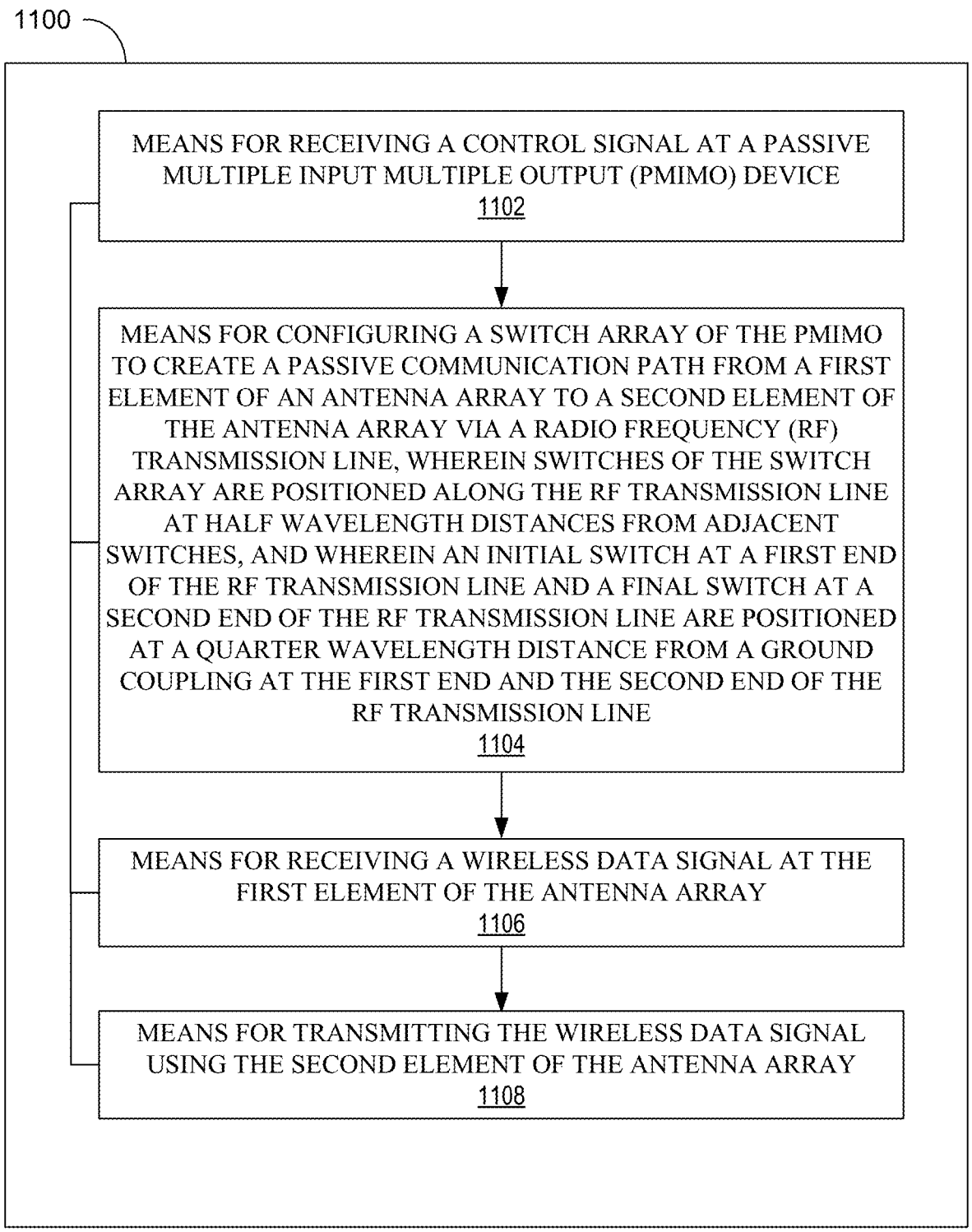
FIG. 11 illustrates aspects of a pMIMO device in accordance with aspects described herein.

FIG. 11 is a functional block diagram of a wireless communication apparatus, that may be a pMIMO device or a portion of a pMIMO device. The apparatus 1100 comprises means 1102 for receiving a control signal at a passive multiple input multiple output (pMIMO) device The apparatus 1100 comprises means 1104 for configuring a switch array of the pMIMO to create a passive communication path from a first element of an array of antennas to a second element of the array of antennas via a radio frequency (RF) transmission line, wherein switches of the switch array are positioned along the RF transmission line at half wavelength distances from adjacent switches, and wherein an initial switch at a first end of the RF transmission line and a final switch at a second end of the RF transmission line are positioned at a quarter wavelength distance from a ground coupling at the first end and the second end of the RF transmission line.

The apparatus 1100 comprises means 1106 for receiving a wireless data signal at the first element of the array of antennas.

The apparatus 1100 comprises means 1108 for transmitting the wireless data signal using the second element of the array of antennas.

Additionally, in some aspects, the apparatus 1100 can include duplicated components or additional components in accordance with any pMIMO device or element of a communication system described herein.

Devices, networks, systems, and certain means for transmitting or receiving signals described herein may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles, and will be referred to herein as "sub-7 GHz". A similar nomenclature issue sometimes occurs with regard to FR2, which is often referred to (interchangeably) as a "millimeter wave" (mmW) band in documents and articles, despite including frequencies outside of the extremely high frequency (EHF) band (30 GHz-300 GHz) which is identified by the International Telecommunications Union (ITU) as a "mmWave" or mmW band. In other examples, higher frequencies, such as those in a sub-THz band, may be used. Unless specifically stated otherwise, it should be understood that the term "mmWave", mmW, or the like if used herein may broadly represent frequencies that may include mid-band frequencies, may be within FR2, or may be within the EHF band. In some configurations, pMIMO devices as described above may enable sufficient performance as compared to previous structures while using a fewer number of antennas (for example, a two dimensional matrix having tens (e.g., 16 or 25) or around a hundred antennas instead of hundreds or thousands). In some examples, multiple arrays are disposed near one another, with each array being configured for a specific frequency or range of frequencies.

The circuit architecture described herein described herein may be implemented on one or more ICs, analog ICs, mmWICs, mixed-signal ICs, ASICs, printed circuit boards (PCBs), electronic devices, etc. The circuit architecture described herein may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the circuit described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR) or corresponding mmW elements, (iv) an ASIC such as a mobile station modem (MSM), (v) a module that may be embedded within other devices, (vi) a receiver, cellular phone, wireless device, handset, or mobile unit, (vii) etc.

Although selected aspects have been illustrated and described in detail, it will be understood that various substitutions and alterations may be made therein without departing from the spirit and scope of the present invention, as defined by the following claims.

Illustrative aspects of the present disclosure include, but are not limited to:

Aspect 1: A wireless communication apparatus, comprising: a first radio frequency (RF) transmission line having a first terminated with a quarter wavelength grounded transmission line; a first array of antennas including a plurality of antenna elements; a switch array including a corresponding switch for each antenna element of the plurality of antenna elements of the first array of antennas, wherein the corresponding switch for each antenna element is configurable to selectively connect each antenna element to the first RF transmission line, wherein an initial switch of the switch array is coupled to the first RF transmission line at a quarter wavelength distance from the first end of the first RF transmission line, and wherein each switch of the switch array is coupled to the first RF transmission line at an integer multiple of a half wavelength distance from a corresponding adjacent switch of the switch array along the first RF transmission line; and one or more lens elements configured to modify wireless inputs signals to the first array of antennas and to modify wireless output signals from the first array of antennas.

Aspect 2: The wireless communication apparatus of aspect 1, wherein the first RF transmission line further comprises a second end terminated with a quarter wavelength grounded transmission line, and wherein a final switch of the switch array is coupled to the first RF transmission line at the quarter wavelength distance from the second end of the first RF transmission line.

Aspect 3: The wireless communication apparatus of any of aspects 1 through 2, further comprising control circuitry coupled to the first array of antennas, wherein the control circuitry is configured select a switching configuration with a first selected switch closed for reception of a communication signal via a first selected antenna connected to the first selected switch, a second selected switch closed for transmission of the communication signal via a second selected antenna connected to the second selected switch, and switches of the switch array other than the first selected switch and the second selected switch in an open position.

Aspect 4: The wireless communication apparatus of any of aspects 1 through 2, further comprising control circuitry coupled to the switch array and configured to direct a wireless communication signal along a selected path without amplification of the wireless communication signal from a first antenna element of the first array of antennas selected as an input, to the first RF transmission line, and to a second antenna of the first array of antennas selected as an output, by selecting an open or closed state for each switch of the switch array.

Aspect 5: The wireless communication apparatus of any of aspects 1 through 4, further comprising a control antenna coupled to the control circuitry, wherein the control circuitry is configured to receive control instructions from a base station via the control antenna.

Aspect 6: The wireless communication apparatus of any of aspects 3 through 5, further comprising a wired communication port coupled to the control circuitry, wherein the control circuitry is configured to receive control instructions from a base station via the wired communication port.

Aspect 7: The wireless communication apparatus of any of aspects 1 through 6, wherein the one or more lens elements comprise a single elliptical lens, a single hemispherical lens, or a single fisheye lens positioned to direct input signals to the first array of antennas and to direct output signals from the first array of antennas.

Aspect 8: The wireless communication apparatus of any of aspects 1 through 7, further comprising: a second RF transmission line having a first end terminated with a quarter wavelength grounded transmission line; a second array of antennas; and a second switch array providing the corresponding switch for each antenna element of the second array of antennas; wherein the first array of antennas is linear and positioned along a first line, wherein the second array of antennas is linear and positioned along a second line orthogonal to the first line, and wherein the one or more lens elements are further configured to modify wireless inputs signals to the second array of antennas and wireless output signals from the second array of antennas.

Aspect 9: The wireless communication apparatus of aspect 8, wherein the second RF transmission line is coupled to the first RF transmission line via an additional switch configurable to allow communication signals received at the first array of antennas to be transmitted via the second array of antennas.

Aspect 10: The wireless communication apparatus of any of aspects aspect 1 through 7, further comprising: a second RF transmission line having a first end coupled to a ground; a connecting RF transmission line; wherein the first array of antennas comprises at least two rows of antenna elements; wherein the switch array comprises at least two rows of switch elements; wherein a first row of antenna elements is coupled to the first RF transmission line via a first row of switch elements; wherein a second row of antenna elements is coupled to the second RF transmission line via a second row of switch elements; and wherein a second end of the first RF transmission line is connectable to the connecting RF transmission line via a first connecting switch; wherein a second end of the second RF transmission line is connectable to the connecting RF transmission line via a second connecting switch.

Aspect 11: The wireless communication apparatus of aspect 10, further comprising a first quarter wavelength stub having a first end connected to a ground, wherein the first connecting switch selects between connecting the second end of the first RF transmission line to a second end of the first quarter wavelength stub and the connecting RF transmission line.

Aspect 12: The wireless communication apparatus of aspect 11, wherein the connecting RF transmission line comprises a first end connected to the ground, wherein the first RF transmission line is connectable to the connecting RF transmission line at a quarter wavelength distance from the first end of the connecting RF transmission line.

Aspect 13: The wireless communication apparatus of aspect 12, wherein the connecting RF transmission line comprises a second end connected to the ground; wherein the first RF transmission line is connectable to the connecting RF transmission line at a quarter wavelength distance from the second end of the connecting RF transmission line; and wherein the first RF transmission line is connectable to the connecting RF transmission line at an integer multiple of the half wavelength distance from a connection between the second RF transmission line and the connecting RF transmission line.

Aspect 14: The wireless communication apparatus of aspect 13, further comprising a plurality of RF transmission lines comprising at least the first RF transmission line, the second RF transmission line, and a third RF transmission line; wherein each transmission line of the plurality of RF transmission lines is connected to a corresponding row of antenna elements of the first array of antennas via a corresponding row of switches of the switch array such that each antenna element is associated with a single switch of the switch array; wherein each transmission line of the plurality of RF transmission lines has a first end coupled to the ground and a second end couplable via corresponding connecting switches to either a corresponding quarter wavelength stub or the connecting RF transmission line; and wherein the corresponding connecting switches attach to the connecting RF transmission line at integer multiples of a half wavelength distance from adjacent corresponding connecting switches.

Aspect 15: The wireless communication apparatus of aspect 14, further comprising control circuitry configured to control the switch array and the corresponding connection switches to create a first passive transmission path from a first antenna element to a second antenna element of the first array of antennas.

Aspect 16: The wireless communication apparatus of aspect 15, further comprising a single phase shifter for each corresponding row of switches, wherein the control circuitry is configured to control the single phase shifter for the first passive transmission path to direct the wireless output signals in conjunction with the one or more lens elements.

Aspect 17: The wireless communication apparatus of aspect 15, wherein the control circuitry is configured to create a second passive transmission path using the second RF transmission line, the connecting RF transmission line, and the third RF transmission line to relay a first signal on the second passive transmission path while simultaneously relaying a second signal on the first passive transmission path, such that the first signal and second signal are isolated by the switch array and the corresponding connecting switches.

Aspect 18: The wireless communication apparatus of any of aspects 1 through 18 excluding aspect 7, wherein the one or more lens elements comprises a flat metasurface lens with co-centric loop units.

Aspect 19: The wireless communication apparatus of any of aspects 1 through 18 excluding aspect 7, wherein the one or more lens elements comprises a spherical lens.

Aspect 20: The wireless communication apparatus of any of aspects 1 through 19, wherein the first array of antennas comprises between 16 and 100 antenna elements.

Aspect 21: A wireless communication apparatus, comprising: a Butler matrix comprising a plurality of antenna ports and a plurality of beam ports; a switch array comprising a corresponding switch coupled to each beam port of the plurality of beam ports; and a radio frequency (RF) transmission line coupled to the switch array, the RF transmission line comprising a first end coupled to ground and a second end coupled to ground, wherein a first switch of the switch array is coupled to the RF transmission line at a quarter wavelength distance from the first end, wherein a second switch of the switch array is coupled to the RF transmission line at the quarter wavelength distance from the second end, and where each switch of the switch array is coupled to the RF transmission line at a half wavelength distance from adjacent switches of the switch array along the RF transmission line.

Aspect 22: The wireless communication apparatus of aspect 21, wherein the Butler matrix is configured to support beam forming in a single plane.

Aspect 23: The wireless communication apparatus of any of aspects 21 through 22, wherein the Butler matrix comprises an 8×8 Butler matrix comprising eight beam ports and eight antenna ports.

Aspect 24: The wireless communication apparatus of aspect 21, further comprising: a plurality of Butler matrixes comprising the Butler matrix; a plurality of RF transmission lines comprising a corresponding transmission line for each Butler matrix of the plurality of Butler matrixes, and wherein the plurality of RF transmission lines comprises the RF transmission line; and a connecting transmission line coupled to an end of teach corresponding transmission line for each Butler matrix of the plurality of Butler matrixes.

Aspect 25: The wireless communication apparatus of aspect 24, further comprising one or more phase shifters coupled to the plurality of RF transmission lines and configured to adjust a phase of a communication signal within the wireless communication apparatus.

Aspect 26A: The wireless communication device of any of Aspects 21 through 25, further comprising: a plurality of Butler matrixes comprising the Butler matrix; a single path N through (SPNT) receive (RX) switch coupled to the plurality of Butler matrixes; a SPNT transmit (TX) switch coupled to the plurality of Butler matrixes; and a phase shifter coupled to the SPTN RX switch and the SPNT TX switch.

Aspect 26B: The wireless communication device of any of Aspects 21 through 25, further comprising: a plurality of Butler matrixes comprising the Butler matrix; a plurality of single path N through (SPNT) receive (RX) switches, wherein each of the SPNT RX switches is coupled to a corresponding Butler matrix of the plurality of Butler matrixes; a plurality of SPNT transmit (TX) switches, wherein each of the SPNT TX switches is paired with a corresponding SPNT RX switch and coupled to the corresponding Butler matrix of the plurality of Butler matrixes; and a plurality of phase shifters, each phase shifter of the plurality of phase shifters coupled to corresponding pairs of SPTN RX and SPTN RX switches. coupled to the SPTN RX switch and the SPNT TX switch.

Aspect 27: A method comprising: receiving a control signal at a passive multiple input multiple output (pMIMO) device; configuring a switch array of the pMIMO device to create a passive communication path from a first element of an array of antennas to a second element of the array of antennas via a radio frequency (RF) transmission line, wherein switches of the switch array are positioned along the RF transmission line at half wavelength distances from adjacent switches, and wherein an initial switch at a first end of the RF transmission line and a final switch at a second end of the RF transmission line are positioned at a quarter wavelength distance from a ground coupling at the first end and the second end of the RF transmission line; receiving a wireless data signal at the first element of the array of antennas; passively communicating the wireless data signal from the first element of the array of antennas to the second element of the array of antennas using the passive communication path; and transmitting the wireless data signal using the second element of the array of antennas.

Aspect 28: A wireless communication apparatus, comprising: an array of antennas; a beam forming structure coupled to the array of antennas, wherein wireless signals incident on the wireless communication apparatus at a plurality of angles correspond to respective ports of the array of antennas based on operation of the beam forming structure; one or more transmission lines each having a first end terminated with a quarter wavelength grounding line; and a plurality of switches configured to couple respective antennas of the array of antennas to corresponding transmission lines of the one or more transmission lines, wherein an initial switch coupled to each corresponding transmission line is positioned at a quarter wavelength distance from the first end of the corresponding transmission line, and wherein each switch of the switch array is coupled to the corresponding transmission line at an integer multiple of a half wavelength distance from a corresponding adjacent switch of the switch array.

Aspect 29: A wireless communication apparatus, comprising: an array of antennas; a beam forming structure coupled to the array of antennas, wherein wireless signals incident on the wireless communication apparatus at a plurality of angles correspond to respective ports based on operation of the beam forming structure; one or more transmission lines; and a plurality of switches configured to couple the respective ports to the one or more transmission lines.

Aspect 30: The wireless communication apparatus of Aspect 29, wherein the one or more transmission lines each have a first end terminated with a quarter wavelength grounding line; and wherein the plurality of switches are configured to couple the respective ports to corresponding transmission lines of the one or more transmission lines via the plurality of switches with an initial switch coupled to each corresponding transmission line positioned at a quarter wavelength distance from the first end of the corresponding transmission line, and wherein each switch of the plurality of switches is coupled to the corresponding transmission line at an integer multiple of a half wavelength distance from a corresponding adjacent switch of the plurality of switches.

Aspect 31: The wireless communication apparatus of any of Aspects 29 through 30, wherein the respective ports comprise feed ports, wherein the beam forming structure comprises a lens configured to focus the wireless signals onto respective antennas, each of the respective antennas being coupled to a respective feed port.

Aspect 32: The wireless communication apparatus of any of Aspects 29 through 31, wherein the beam forming structure comprises a Butler matrix coupled to the array of antennas, and wherein the respective ports comprise beam ports of the antenna matrix.

Aspect 33: The wireless communication apparatus of any of Aspects 29 through 32, wherein the wireless communication device is configured to receive control information from a network entity, and configured to open and close certain of the plurality of switches to enable communication between a base station and a user equipment without amplification in the wireless communication apparatus based on the control information.

Aspect 34: An apparatus comprising means for implementing a passive multiple input multiple output (pMIMO) device in accordance with any aspect described above.

Aspect 35: A non-transitory computer readable storage medium comprising instructions that, when executed by processing circuitry of a device, cause the device to control passive multiple input multiple output (pMIMO) device operations in accordance with any aspect described above.

What is claimed is:

1. A wireless communication apparatus, comprising:
a first radio frequency (RF) transmission line having a first end terminated with a quarter wavelength grounded transmission line;
a first array of antennas including a plurality of antenna elements;
a switch array including a corresponding switch for each antenna element of the plurality of antenna elements of the first array of antennas, wherein the corresponding switch for each antenna element is configurable to selectively connect each antenna element to the first RF transmission line, wherein an initial switch of the switch array is coupled to the first RF transmission line at a quarter wavelength distance from the first end of the first RF transmission line, and wherein each switch of the switch array is coupled to the first RF transmission line at an integer multiple of a half wavelength distance from a corresponding adjacent switch of the switch array along the first RF transmission line; and
one or more lens elements configured to modify wireless inputs signals to the first array of antennas and to modify wireless output signals from the first array of antennas.

2. The wireless communication apparatus of claim 1, wherein the first RF transmission line further comprises a second end terminated with a quarter wavelength grounded transmission line, and wherein a final switch of the switch array is coupled to the first RF transmission line at the quarter wavelength distance from the second end of the first RF transmission line.

3. The wireless communication apparatus of claim 1, further comprising control circuitry coupled to the first array of antennas, wherein the control circuitry is configured to select a switching configuration with a first selected switch closed for reception of a communication signal via a first selected antenna connected to the first selected switch, a second selected switch closed for transmission of the communication signal via a second selected antenna connected to the second selected switch, and switches of the switch array other than the first selected switch and the second selected switch in an open position.

4. The wireless communication apparatus of claim 1, further comprising control circuitry coupled to the switch array and configured to direct a wireless communication signal along a selected path without amplification of the wireless communication signal from a first antenna element of the first array of antennas selected as an input, to the first RF transmission line, and to a second antenna of the first array of antennas selected as an output, by selecting an open or closed state for each switch of the switch array.

5. The wireless communication apparatus of claim 4, further comprising a control antenna coupled to the control circuitry, wherein the control circuitry is configured to receive control instructions from a base station via the control antenna.

6. The wireless communication apparatus of claim 4, further comprising a wired communication port coupled to the control circuitry, wherein the control circuitry is configured to receive control instructions from a base station via the wired communication port.

7. The wireless communication apparatus of claim 1, wherein the one or more lens elements comprise a single elliptical lens, a single hemispherical lens, or a single fisheye lens positioned to direct input signals to the first array of antennas and to direct output signals from the first array of antennas.

8. The wireless communication apparatus of claim 1, further comprising:
a second RF transmission line having a first end terminated with a quarter wavelength grounded transmission line;
a second array of antennas; and
a second switch array providing the corresponding switch for each antenna element of the second array of antennas.

9. The wireless communication apparatus of claim 8, wherein the second RF transmission line is coupled to the first RF transmission line via an additional switch configurable to allow communication signals received at the first array of antennas to be transmitted via the second array of antennas.

10. The wireless communication apparatus of claim 1, further comprising:
a second RF transmission line having a first end coupled to a ground;
a connecting RF transmission line;
wherein the first array of antennas comprises at least two rows of antenna elements;
wherein the switch array comprises at least two rows of switch elements;
wherein a first row of antenna elements is coupled to the first RF transmission line via a first row of switch elements;
wherein a second row of antenna elements is coupled to the second RF transmission line via a second row of switch elements; and
wherein a second end of the first RF transmission line is connectable to the connecting RF transmission line via a first connecting switch;
wherein a second end of the second RF transmission line is connectable to the connecting RF transmission line via a second connecting switch.

11. The wireless communication apparatus of claim 10, further comprising a first quarter wavelength stub having a first end connected to a ground, wherein the first connecting switch selects between connecting the second end of the first RF transmission line to a second end of the first quarter wavelength stub and the connecting RF transmission line.

12. The wireless communication apparatus of claim 11, wherein the connecting RF transmission line comprises a first end connected to the ground, wherein the first RF transmission line is connectable to the connecting RF transmission line at a quarter wavelength distance from the first end of the connecting RF transmission line.

13. The wireless communication apparatus of claim 12, wherein the connecting RF transmission line comprises a second end connected to the ground;
wherein the first RF transmission line is connectable to the connecting RF transmission line at a quarter wavelength distance from the second end of the connecting RF transmission line; and
wherein the first RF transmission line is connectable to the connecting RF transmission line at an integer multiple of the half wavelength distance from a connection between the second RF transmission line and the connecting RF transmission line.

14. The wireless communication apparatus of claim 13, further comprising a plurality of RF transmission lines comprising at least the first RF transmission line, the second RF transmission line, and a third RF transmission line;
wherein each transmission line of the plurality of RF transmission lines is connected to a corresponding row of antenna elements of the first array of antennas via a corresponding row of switches of the switch array such that each antenna element is associated with a single switch of the switch array;
wherein each transmission line of the plurality of RF transmission lines has a first end coupled to the ground and a second end couplable via corresponding connecting switches to either a corresponding quarter wavelength stub or the connecting RF transmission line; and
wherein the corresponding connecting switches attach to the connecting RF transmission line at integer multiples of a half wavelength distance from adjacent corresponding connecting switches.

15. The wireless communication apparatus of claim 14, further comprising control circuitry configured to control the switch array and the corresponding connection switches to create a first passive transmission path from a first antenna element to a second antenna element of the first array of antennas.

16. The wireless communication apparatus of claim 15, further comprising a single phase shifter for each corresponding row of switches, wherein the control circuitry is configured to control the single phase shifter for the first passive transmission path to direct the wireless output signals in conjunction with the one or more lens elements.

17. The wireless communication apparatus of claim 15, wherein the control circuitry is configured to create a second passive transmission path using the second RF transmission line, the connecting RF transmission line, and the third RF transmission line to relay a first signal on the second passive transmission path while simultaneously relaying a second signal on the first passive transmission path, such that the first signal and second signal are isolated by the switch array and the corresponding connecting switches.

18. The wireless communication apparatus of claim 1, wherein the one or more lens elements comprises a flat metasurface lens with co-centric loop units.

19. The wireless communication apparatus of claim 1, wherein the one or more lens elements comprises a spherical lens.

20. The wireless communication apparatus of claim 1, wherein the first array of antennas comprises between 16 and 100 antenna elements.

\* \* \* \* \*